(12) United States Patent
Park

(10) Patent No.: US 10,722,070 B2
(45) Date of Patent: Jul. 28, 2020

(54) MULTI-LAYERED EXOTHERMIC MICROWAVE COOKWARE

(71) Applicant: Jong Peter Park, Pasadena, CA (US)

(72) Inventor: Jong Peter Park, Pasadena, CA (US)

( * ) Notice: Subject to any disclaimer, the term of this patent is extended or adjusted under 35 U.S.C. 154(b) by 260 days.

(21) Appl. No.: 14/977,239

(22) Filed: Dec. 21, 2015

(65) Prior Publication Data

US 2016/0360920 A1 Dec. 15, 2016

Related U.S. Application Data

(63) Continuation-in-part of application No. 14/797,100, filed on Jul. 11, 2015.

(60) Provisional application No. 62/191,305, filed on Jul. 10, 2015, provisional application No. 62/175,408, filed on Jun. 14, 2015.

(51) Int. Cl.
| | |
|---|---|
| *A47J 36/02* | (2006.01) |
| *A47J 27/00* | (2006.01) |
| *A47J 36/04* | (2006.01) |
| *H05B 6/64* | (2006.01) |

(52) U.S. Cl.
CPC .......... *A47J 36/027* (2013.01); *A47J 27/002* (2013.01); *A47J 36/04* (2013.01); *H05B 6/6408* (2013.01); *H05B 6/6494* (2013.01)

(58) Field of Classification Search
None
See application file for complete search history.

(56) References Cited

U.S. PATENT DOCUMENTS

| | | | | |
|---|---|---|---|---|
| 3,742,178 A | * | 6/1973 | Harnden, Jr. | A47J 27/002 219/627 |
| 3,837,895 A | * | 9/1974 | Pryor | A47J 36/02 428/422 |
| 3,909,591 A | * | 9/1975 | Ulam | A47J 27/002 219/438 |
| 3,927,243 A | * | 12/1975 | Theisen | A47J 36/02 428/433 |
| 3,934,748 A | * | 1/1976 | Racz | A47J 36/022 99/447 |
| 3,971,361 A | * | 7/1976 | Hurko | A47J 36/04 126/390.1 |
| 3,983,275 A | * | 9/1976 | Winter | A47J 36/02 428/34.7 |
| 4,552,284 A | * | 11/1985 | Rummelsburg | A47J 36/02 220/573.1 |
| 4,614,852 A | * | 9/1986 | Matsushita | A47J 36/02 219/621 |

(Continued)

*Primary Examiner* — Ibrahime A Abraham
*Assistant Examiner* — Gyounghyun Bae
(74) *Attorney, Agent, or Firm* — Bum Pak; PatenetBum.Com

(57) ABSTRACT

Some embodiments provide a multi-layered exothermic microwave cooking apparatus. The apparatus includes an inner cooking plate shell having top and bottom faces. The apparatus also includes an exothermic plastic outer shell to generate heat from microwave radiation. The outer exothermic shell of the vessel has a bottom surface and at least one side wall, and the inner cooking plate shell closes the vessel to create a cooking surface, and to form an inner space between the bottom surface and the plate. The apparatus also includes a safety valve, which is installed on the side wall of the vessel, to release excess pressure from the inner space during microwave cooking.

12 Claims, 28 Drawing Sheets

(56) References Cited

U.S. PATENT DOCUMENTS

| | | | | |
|---|---|---|---|---|
| 4,880,951 A * | 11/1989 | Levinson | A47J 27/002 | 219/733 |
| 4,977,302 A * | 12/1990 | Merigaud | H05B 6/6494 | 219/730 |
| 5,064,055 A * | 11/1991 | Bessenbach | A47J 36/02 | 126/390.1 |
| 5,070,223 A * | 12/1991 | Colasante | H05B 6/64 | 219/679 |
| 5,107,087 A * | 4/1992 | Yamada | B65D 81/3453 | 219/730 |
| 5,280,150 A * | 1/1994 | Arai | A21B 2/00 | 219/726 |
| 5,439,165 A * | 8/1995 | Cartossi | B23K 20/023 | 228/265 |
| 5,665,819 A * | 9/1997 | Tenzer | B42D 3/04 | 252/62.6 |
| 5,770,837 A * | 6/1998 | Hatta | A47J 36/02 | 219/621 |
| 5,916,470 A * | 6/1999 | Besser | A47J 36/027 | 126/375.1 |
| 6,267,830 B1 * | 7/2001 | Groll | A47J 27/002 | 148/531 |
| 6,631,824 B2 * | 10/2003 | Park | A47J 27/002 | 220/573.1 |
| 6,698,337 B1 * | 3/2004 | Park | A47J 36/36 | 99/342 |
| 6,715,631 B2 * | 4/2004 | Kim | A47J 27/002 | 220/573.1 |
| 7,681,753 B2 * | 3/2010 | Yokota | F17C 11/005 | 220/581 |
| 8,499,963 B2 * | 8/2013 | Muller | C23C 24/082 | 220/573.2 |
| 8,851,319 B2 * | 10/2014 | Berrux | A47J 36/02 | 219/621 |
| 8,922,969 B2 * | 12/2014 | Sigalov | H05B 6/645 | 219/745 |
| 8,939,313 B2 * | 1/2015 | Cheng | A47J 36/02 | 220/573.1 |
| 9,084,505 B2 * | 7/2015 | Park | A47J 36/025 | |
| 10,154,755 B2 * | 12/2018 | Park | B32B 9/005 | |
| 2002/0051848 A1 * | 5/2002 | Li | B22F 1/025 | 427/376.6 |
| 2003/0209154 A1 * | 11/2003 | Park | A47J 36/02 | 99/403 |
| 2004/0118838 A1 * | 6/2004 | Park | A47J 36/027 | 219/725 |
| 2005/0166762 A1 * | 8/2005 | Alves | A47J 27/58 | 99/279 |
| 2006/0083948 A1 * | 4/2006 | Kawaguchi | H01F 10/08 | 428/692.1 |
| 2007/0000915 A1 * | 1/2007 | Cheng | A47J 27/002 | 219/621 |
| 2007/0235450 A1 * | 10/2007 | Quantrille | C04B 35/117 | 219/730 |
| 2007/0254075 A1 * | 11/2007 | Haars | B65D 85/36 | 426/394 |
| 2007/0284368 A1 * | 12/2007 | Richardson | B65D 17/163 | 219/725 |
| 2009/0065500 A1 * | 3/2009 | England | A47J 27/002 | 219/621 |
| 2009/0173734 A1 * | 7/2009 | Yoshihiro | H01M 8/04208 | 220/23.91 |
| 2011/0293950 A1 * | 12/2011 | Kim | A47J 36/025 | 428/447 |
| 2012/0024845 A1 * | 2/2012 | Lee | C03C 8/02 | 219/725 |
| 2012/0037617 A1 * | 2/2012 | Kim | H05B 6/6408 | 219/725 |
| 2012/0085243 A1 * | 4/2012 | Park | A47J 27/022 | 99/325 |
| 2013/0266699 A1 * | 10/2013 | Middis | B65D 81/3461 | 426/113 |
| 2014/0326733 A1 * | 11/2014 | Park | A47J 27/002 | 220/573.1 |
| 2015/0030738 A1 * | 1/2015 | Meyl | A47J 31/02 | 426/431 |

* cited by examiner

MULTI-LAYERED EXOTHERMIC MICROWAVE COOKWARE

CLAIM OF BENEFIT TO PRIOR APPLICATIONS

This application is a continuation in part of U.S. patent application Ser. No. 14/797,100, filed Jul. 11, 2015, and published as U.S. Patent Application Publication 20150313406. This application also claims the benefit of U.S. Provisional Patent Application 62/175,408, filed Jun. 14, 2015. This application also claims the benefit of U.S. Provisional Patent Application 62/191,305, filed Jul. 10, 2015. U.S. Patent Applications 62/175,408 and 62/191,305, and U.S. Patent Application Publication 20150313406 are incorporated herein by reference.

BACKGROUND

Today, many people use microwave ovens. A person can use one from nearly anywhere (e.g., at home, at work, at the store, etc.). One of the primary reasons for their popularity is because they can conveniently and safely heat food, including beverages. A microwave oven heats food by bombarding it with electromagnetic radiation in the microwave spectrum causing polarized molecules in the food's water content to oscillate back and forth, and thereby generate thermal energy. This microwave cooking process is also known as dielectric heating.

Despite their popularity, microwave ovens or, more specifically, microwave cooking has a number of problems. For instance, microwave cooking can result in food becoming dry, or partially or unevenly heated. In addition, the cooking time can be very long, and the food can lose its original taste after being heated in the microwave oven. The main cause of these problems is due to how the microwave oven heats food through oscillation.

Furthermore, it is commonly advised to avoid placing metal containers in a microwave oven because the electromagnetic waves cannot pass through the metal, unlike glass, plastic, and paper. There is also the possibility that the oscillation of the electromagnetic waves may produce a concentrated electric field at the edge of the metal object. If that edge is in close proximity with another metallic object, sparks may appear between the two objects because of that concentration.

BRIEF SUMMARY

Embodiments described herein a multi-layered exothermic microwave cooking apparatus. The apparatus includes an inner cooking plate shell having top and bottom faces. The apparatus also includes an exothermic plastic outer shell to generate heat from microwave radiation. The outer exothermic shell of the vessel has a bottom surface and at least one side wall, and the inner cooking plate shell closes the vessel to create a cooking surface, and to form an inner space between the bottom surface and the plate.

In some embodiments, the apparatus further includes an exothermic heating plate that is in contact with the bottom face of the cooking plate shell. This exothermic heating plate further generates heat from microwave radiation. In some embodiments, the exothermic heating plate is made by blending $Fe_2O_3$, Mn, Zn, and silica powder with alumina ($Al_2O_3$) ceramic. The exothermic heating plate of some embodiments contains fibrous material or is wrapped with fiber, such as glass wool fiber.

The apparatus of some embodiments also has an insulating material in the inner space of the vessel. Different embodiments can use different insulating material. For instance, the insulating material may be an insulation mat. Also, for instance, the insulating material may be quilted material (e.g., such as a heat-retaining thermal panel). The insulation material can be made with ceramic wool fiber.

The apparatus of some embodiments further includes an exothermic plastic lid that is made with the same exothermic plastic as the vessel. This is to further generate heat from microwave radiation.

In some embodiments, the apparatus's inner shell or plate is made with metal (e.g., copper, aluminum). In some embodiments, the plate is made with metal alloy such as carbon steel. In some embodiments, the plate is an exothermic plate that is coated with ceramic to further generate heat from microwave radiation. In some embodiments, the plate is a ceramic plate.

In some embodiment, the apparatus has safety valve so the vessel is not bent out of shape or cracked when vapor pressure in the inner space reaches its threshold limit. In some embodiments, the safety valve includes (1) a metal cap with at least one hole, (2) a head that fits into the cap, (3) a metal spring to push the head against the cap to substantially close the hole, and (4) a metal housing that is coupled with the metal cap to house the head and metal spring. The safety valve may also include (5) a silicone rubber cap or washer that is placed around the hole formed on the inner side wall of the vessel and the metal cap. In some embodiments, the cap has an inner ring that fits into the hole (e.g., from the inner side wall). In some embodiments, the safety valve has a spring-less silicone rubber valve.

In some embodiments, the exothermic plastic is polyphenylene sulfide (PPS) plastic or syndiotactic polystyrene (SPS) plastic mixed with exothermic particles. In some embodiments, the exothermic particles include ferric oxide ($Fe_2O_3$) powder mixed with Manganese (Mn) and Zinc (Zn) powder, or copper-nickel-zinc (Cu—Ni—Zn) powder.

In some embodiments, several legs are formed on the outer bottom surface of the vessel.

Some embodiments also provide a multi-layered exothermic microwave cooking apparatus. The apparatus includes a cooking plate having top and bottom faces. The apparatus also includes an exothermic rubber vessel to generate heat from microwave radiation. The vessel has a bottom surface and at least one side wall, and the cooking plate closes the vessel to create a cooking surface, and an inner space between the bottom surface and the plate. The apparatus also includes a safety valve, which is installed on the side wall of the vessel, to release excess pressure from the inner space during microwave cooking.

In some embodiments, the exothermic rubber is silicone rubber mixed with exothermic particles In some embodiments, the exothermic particles includes $Fe_2O_3$ powder mixed with Mn and Zn powder, or Cu—Ni—Zn powder.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
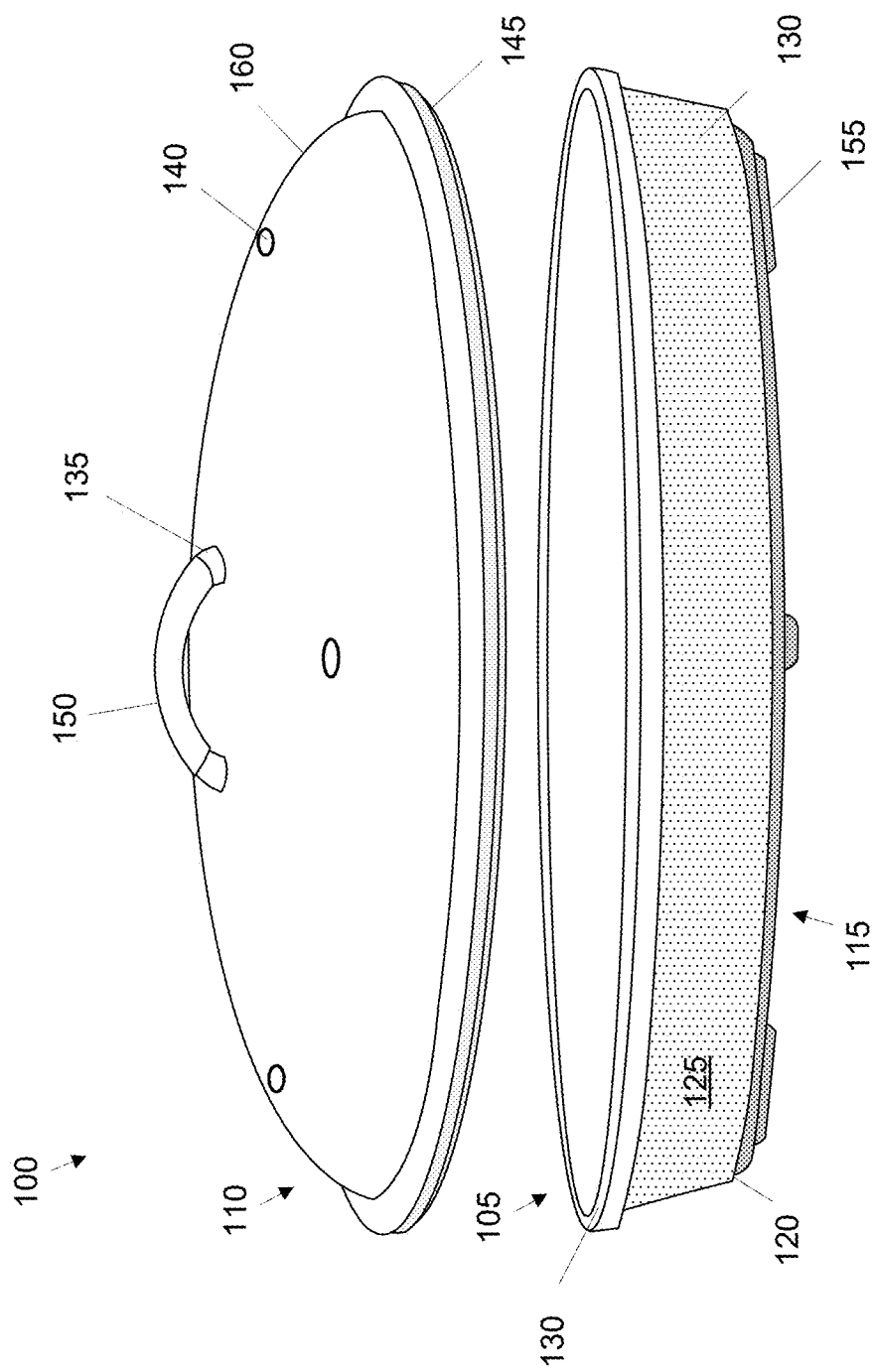
FIG. 1 illustrates an exploded view of a microwave cooking apparatus according to some embodiments of the invention.

Some embodiments described herein provide a multi-purpose microwave cooking apparatus. The microwave cooking apparatus (also referred to herein as microwave cookware) is multi-purpose in that it can be used to cook food differently. This includes frying, roasting, steaming, and baking. FIG. 1 illustrates an exploded view of a microwave cooking apparatus according to some embodiments of the invention. FIG. 1 will be described by reference to FIG. 2 that shows the different layers of the microwave cooking apparatus.

As shown in FIG. 1, the apparatus 100 has a vessel 105, a lid 110, and a heating element 115. In some embodiments, the vessel 105 is metallic, and has a bottom surface 120, a side wall 125, and an edge 130. An open region is defined with the side wall extending from the bottom surface to the outer edge. In some embodiments, at least a portion of the outer side wall is coated with a layer of exothermic coating 130 to insulate the vessel and generate thermal energy from microwave radiation.

In some embodiments, the cooking apparatus 100 includes a heating element 115 adapted to further generate thermal energy from microwave radiation. The heating element 115 has a top face that is attached to the outer bottom surface of the vessel so as to distribute heat along the bottom of the vessel. In some embodiments, the heating element 115 is a mixture of elastic material and ferrite particles. In some embodiments, the heating element 115 is ferrite rubber. The ferrite rubber can potentially provide exothermic heat at least up to 280° Celsius (C). In some embodiments, several legs 155 are formed on a bottom face of the elastic material to raise the vessel in order to prevent rapid heat loss. Additional details relating to such a heating element will be described below by reference to FIGS. 13-16.

In some embodiments, at least a portion of the outer side wall 125 of the vessel is coated with a layer of exothermic coating 130. In some embodiments, the outer bottom surface 120 of the vessel is also coated with the exothermic coating. The exothermic coating 130 of some embodiments is an exothermic glaze having ferrite, silicon (Si), and aluminum (Al) particles. In some embodiments, the exothermic materials include ferrite powder, Mn, Zn, silicon oxide (SiO2), Si, and aluminum oxide (Al2O3). In some embodiments, the exothermic coating is an exothermic glaze having a mixed metal powder compound (e.g., Fe2O3) with ferrosilicon (Fe—Si) powder, aluminum silicate powder, and ethylene glycol.

Instead of the exothermic glaze, the vessel 105 of some embodiments is coated with a ceramic coat. The ceramic coat of some embodiments is a mixture of ceramic powder and exothermic particles. In some embodiments, the exothermic particles include ferrite powder. In some embodiments, the exothermic particles also includes manganese zinc (MnZn) powder, magnesium copper zinc (MgCuZn) powder, and nickel zinc (NiZn) powder. As mentioned above, the exothermic materials include ferrite powder, Mn, Zn, silicon oxide (SiO2), Si, and aluminum oxide (Al2O3). In some embodiments, the exothermic particles include Fe2O3 powder with Manganese (Mn) and Zinc (Zn) powder, or copper-nickel-zinc (Cu—Ni—Zn) powder for electro-microwave absorption.

Figure 2:
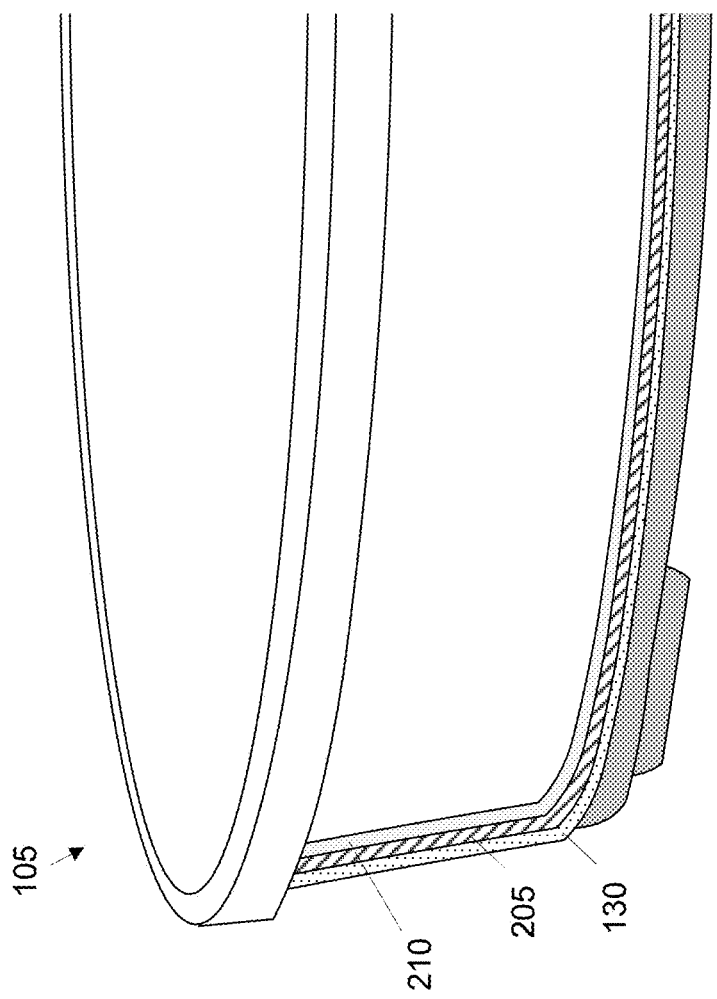
FIG. 2 shows a cross-sectional view of the different layers of the vessel of the microwave cooking apparatus of FIG. 1.

FIG. 2 shows the different layers of the vessel of the microwave cooking apparatus of FIG. 1. As shown, the vessel includes a metallic body 205. In some embodiments, the vessel is formed using aluminum, stainless steel, copper, carbon steel, and/or clad metal. In some embodiments, the inner area is coated with a layer of non-stick coating 210. Specifically, the inner bottom surface and the inner side wall are coated with the non-stick coat 210. As stated above, the metallic body 205 may be coated with an exothermic glaze 130 or a ceramic coat.

Referring to FIG. 1, the cooking apparatus 100 includes a lid 110. The lid has a handle 135 to handle the lid. A person can use the handle to place the lid over the vessel or remove it from the vessel. At least one vent hole 140 is formed on the lid to allow heated moisture to escape the vessel without disengaging the lid from the vessel. In some embodiments, the handle 135 is wrapped with a protective member 150 to make the handle safe to touch when the vessel 105 is heated. In some embodiments, the protective member is made of silicone rubber.

In some embodiments, the lid 110 has a metal disk 160 made of metal to reflect microwave radiation. This is to prevent food being cooked with microwaves. In some embodiments, the metal is stainless steel. The metal disk can be carbon steel, aluminum, stainless steel, copper, and/or clad metal. As shown, the metal disk can be dome-shaped.

In some embodiments, the lid is coated with the exothermic glaze or ceramic coat. By coating the lid, the microwavable cookware of some embodiments generates heat from all sides. For example, the coat on the lid and vessel generate thermal energy from microwave radiation. Similar to a gas or electric oven, the cookware can cook a food item from all sides.

The lid 110 has an elastic ring 145 to fit into the vessel to substantially seal the container. The elastic ring 145 is attached to the outer edge of the metal disk and sits between the metal disk and the vessel when the lid is placed over the vessel. This is so that the metal disk does not make contact with the vessel, and that there is a predetermined amount of space between the outer edges of metal disk and the vessel in order to prevent arcing or sparks from appearing between the outer edges of the lid and the vessel. In some embodiments, the elastic ring 145 is a silicone rubber ring.

The elastic ring can be coupled to the lid in various different ways. For instance, the elastic ring can be glued to the lid. Alternatively, the lid may be shaped to hold the elastic ring.

Figure 3:
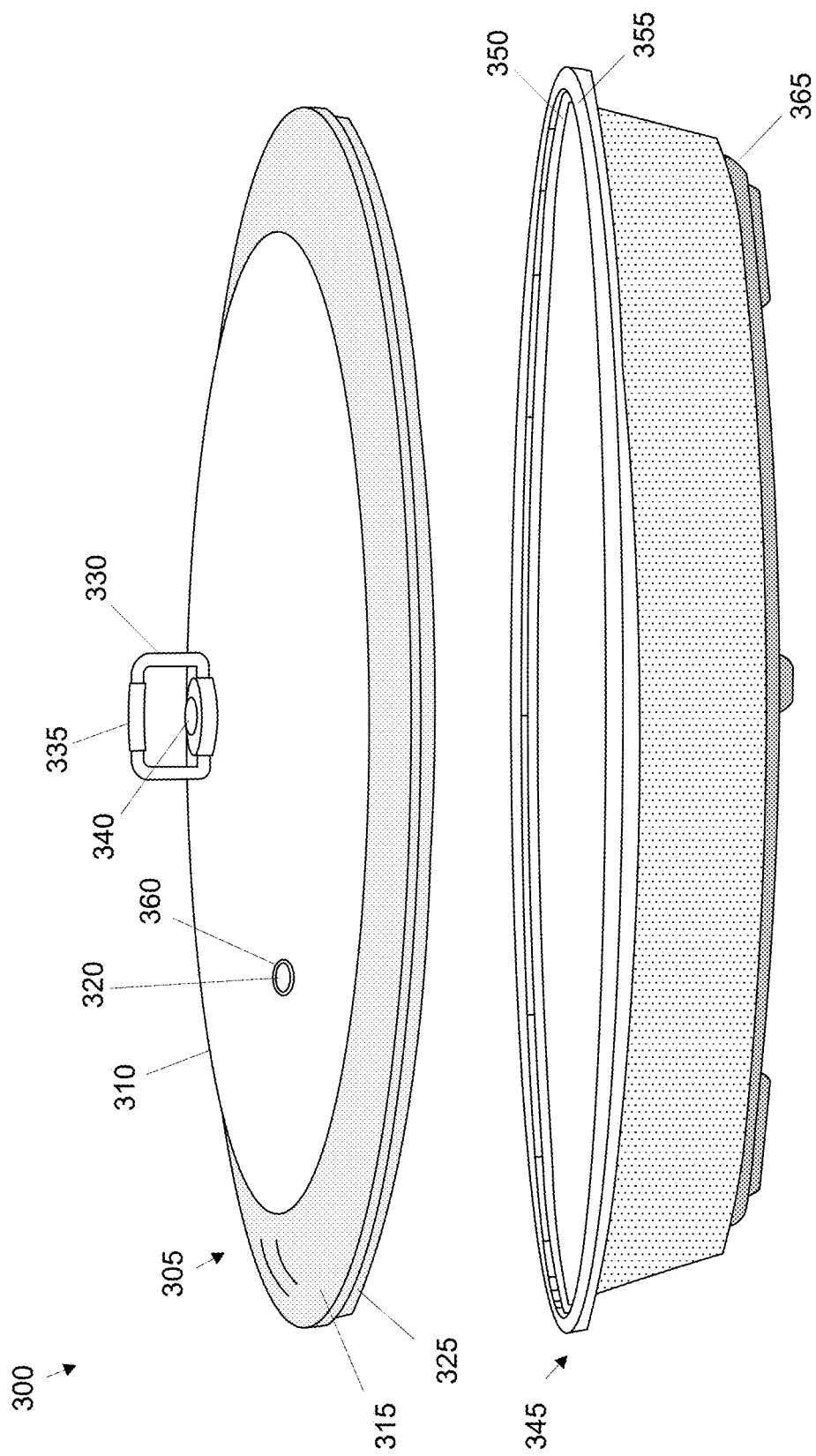
FIG. 3 illustrates a see-through lid of the microwave cooking apparatus according to some embodiments.

In some embodiments, the cooking apparatus has a see-through, or a look and cook lid adapted to cover the vessel. FIG. 3 illustrates a see-through lid 305 of the microwave cooking apparatus 300 according to some embodiments. The see-through lid 305 of some embodiments has a glass disk 310 that is surrounded by a non-metallic rim 315. The glass may be tempered glass. The figure also shows a vessel 345. Attached to the vessel is the heating element 365 that is described above by reference to FIG. 1.

The glass disk 310 may be dome-shaped. In the example of FIG. 3, the glass disk is slightly dome-shaped, which makes the apparatus 300 ideal for frying food with a microwave oven. At least one vent hole 320 is formed on the lid 305 to allow heated moisture to escape the open area of the vessel 345 without disengaging the lid from the vessel. In the illustrated example, only one vent hole 320 is formed on the glass disk. A metal ring 360 is placed in the vent hole in order to protect the glass disk 310.

In some embodiments, the lid 305 has a handle 330 to place the lid on the container (i.e., vessel) or remove the lid from container. As shown in FIG. 3, a hole is formed on the center of the glass disk 310, and a coupling member 340 is inserted in the hole to couple the glass disk to the handle 330. The handle 330 is wrapped with a protective member 345 to make the handle safe to touch when the vessel is heated. In some embodiments, the protective member 345 is a piece of silicone rubber that wraps around the handle portion of the handle 330. The handle portion being the surface area that a person can pick up when the vessel is heated.

The non-metallic rim 315 includes an elastic ring 325 that fits into the vessel 345 and sits on the edge 350 of the vessel to substantially seal the container. In some embodiments, the non-metallic rim 315 is a silicone rim, and the elastic ring is a silicone ring formed on the silicone rim. In some embodiments, the silicone rim and ring are just one piece of silicone rubber that is shaped to hold the glass disk. For instance, the silicone rim can have an open space to insert the glass therein.

In the example of FIG. 3, the non-metallic rim 315 serves multiple purposes. First, the non-metallic rim 315 supports and protects the glass disk 310. Second, the non-metallic rim 315 is used to prevent sparks from appearing between edges of two metal pieces when the microwave is turned on with the apparatus 300 in it.

In some embodiments, the lid's silicone rubber is mixed with exothermic particles. This is to allow the lid to generate heat from microwave radiation. Instead of silicone rubber, the cookware of some embodiments has a heat resistant plastic lid. For instance, the silicone rim can be made with polyphenylene sulfide (PPS) or syndiotactic polystyrene (SPS) plastic. Like the silicone rubber, the PPS or SPS plastic may be mixed with exothermic particles to generate heat from electromagnetic waves.

In some embodiments, the vessel 345 has an upper outer edge 355 and a lower inner edge 350. In some embodiments, the non-metallic rim 315 has a size (e.g., diameter, radius, and circumference) that allows the rim to fit into the vessel 345. This is so that the silicone ring 325 sits on the lower inner edge 350.

Figure 4:
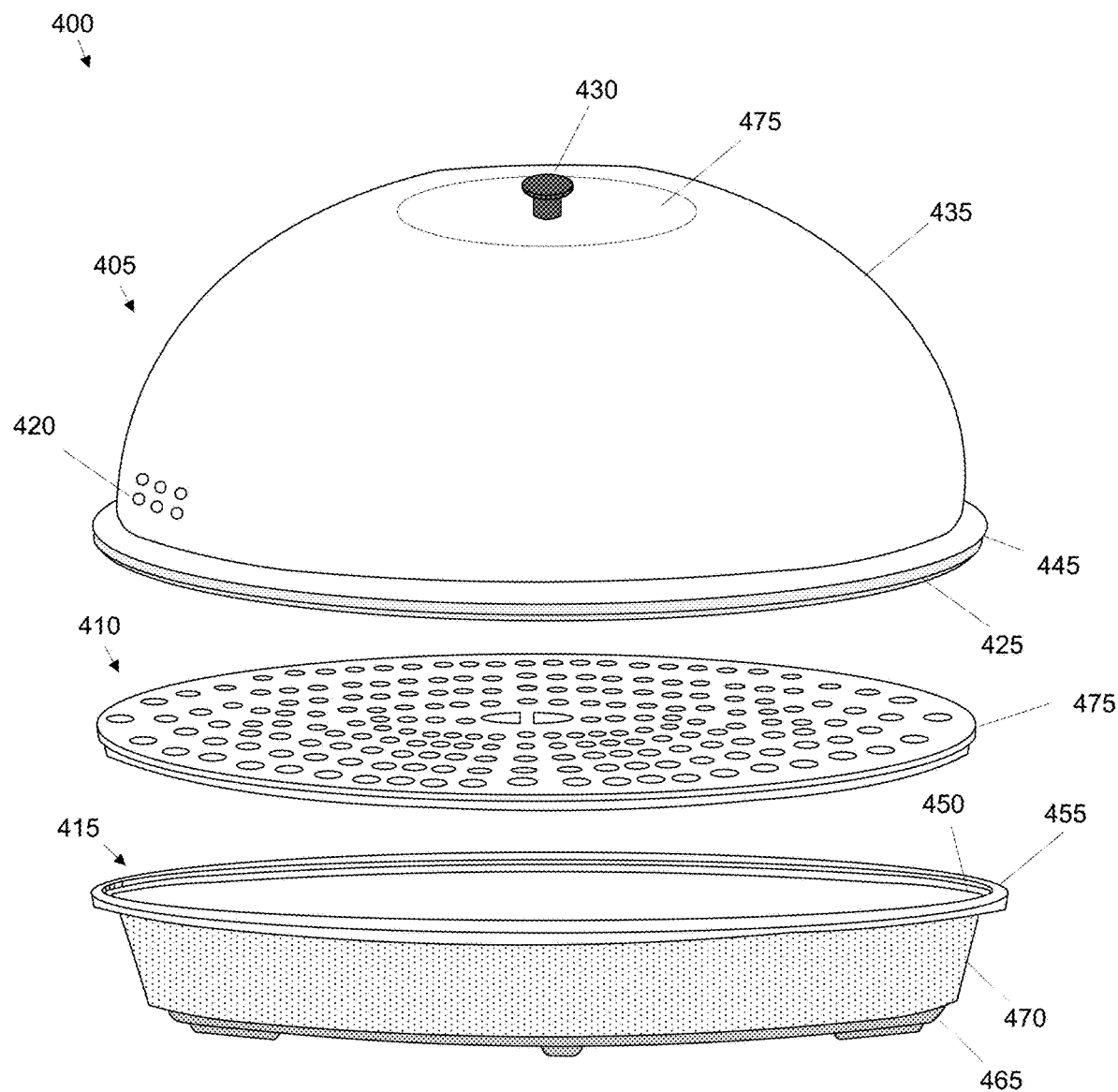
FIG. 4 illustrates a metallic lid and a steamer insert of the microwave cooking apparatus according to some embodiments.

In some embodiments, the cooking apparatus has a metal roaster lid and a steamer insert. FIG. 4 illustrates a metallic lid 405 and a steamer insert 410 of the microwave cooking apparatus 400 according to some embodiments. The figure also shows a vessel 415 that is similar to the one described above by reference to FIG. 1. Attached to the vessel 415 is a heating element 465 that is described above by reference to FIG. 1.

As shown in FIG. 4, the cooking apparatus of has a lid 405 that is formed to cover the vessel. The lid 405 is made with a metal disk 435. The metal disk can shield a food item by reflecting microwaves. In other words, the metal disk prevents the food item being cooked with the microwaves. In some embodiments, the metal is stainless steel. The metal disk 435 can be carbon steel, aluminum, stainless steel, and/or copper.

The metal disk 435 is coupled to an elastic ring 425. The elastic ring 425 is attached to the outer edge 445 of the metal disk 435. The elastic ring 425 sits between the metal disk and the vessel 415 when the lid 405 is placed over the vessel. This is so that the outer edge 445 of the metal disk 435 does not make contact with the vessel. Also, there is a predetermined amount of space between the outer edges of metal disk and the vessel. These are all features of the lid to prevent arcing or sparks from appearing between the outer edges of the lid and the vessel.

In some embodiments, the cookware uses a non-metallic disk. In some embodiments, the lid is made primarily with polyphenylene sulfide (PPS) plastic. In some embodiments, the lid is made of plastic engineered with syndiotactic polystyrene (SPS) resin. In some embodiments, the lid has a silicone rubber disk.

The silicone rubber, PPS plastic, or SPS plastic may be mixed with exothermic particles. For instance, the disk may be made by mixing PPS polymer with exothermic particles. In some embodiments, the exothermic particles include ferric oxide (Fe2O3) powder with Manganese (Mn) and Zinc (Zn) powder, or copper-nickel-zinc (Cu—Ni—Zn) powder. The exothermic particles are for electro-microwave absorption to generate heat.

In some embodiments, the cookware has a lid that is coated with an exothermic glaze or an exothermic ceramic coat. For instance the lid may be coated with a ceramic coat that is blended with exothermic particles (e.g., Fe2O3, and Mn and Zn powder, or Cu—Ni—Zn powder). As another example, the lid may be coated with an exothermic glaze having a mixed metal powder compound (e.g., Fe2O3) with ferrosilicon (Fe—Si) powder, aluminum silicate powder, and ethylene glycol.

In some embodiments, the cookware's lid 405 is dome-shaped. In the example of FIG. 4, the dome is a high-dome or is shaped to have a predetermined height. This allows the apparatus to be used for roasting purposes. For example, the cookware shown in the figure can be used to roasting purposes (e.g., roasting poultry). Thermal energy is generated from the heating element 465 and the outer coat 470 being exposed to microwave radiation. The energy is then transferred to the inner areas of the body of the vessel. As indicated above, the lid may also generate heat from microwave radiation.

As shown, at least one vent hole 420 is formed on the lid 405 to allow heated moisture to escape the open region of the vessel 415 without disengaging the lid from the vessel. In the example of FIG. 4, six vent holes are placed on the side of the dome-shaped lid. The lid 405 also has a handle 430. A hole is formed on the center of the metal disk 435, and a coupling member (not shown) is inserted in the hole to couple the handle 430 to the metal disk. The coupling member can be a screw. If there is a screw, there can also be a washer so that the handle 430 does not easily unscrew. In some embodiments, a surrounding area 475 where the handle 430 is coupled to the plate 435 can be depressed. This is mainly done to save space (e.g., for the cookware to fit into a small microwave oven).

In some embodiments, the microwave cookware further includes a steamer insert to steam food items. In some embodiments, the steamer insert is made of metal. The metal can be aluminum, stainless steel, copper, carbon steel, and/or clad metal. Alternatively, the steamer insert can be made of plastic. In the example of FIG. 4, the steamer insert includes a number of steam holes. Different sections of the steamer can be raised or lowered to allow steam to flow different directions and/or provide places for food (e.g., vegetables) to sit.

In some embodiments, the vessel has an upper outer edge 455 and a lower inner edge 450. In some embodiments, the lid 405 sits over the upper outer edge 455 of the vessel 415, and the steamer insert 410 sits on lower inner edge 450 of the vessel. In the example cookware 400 of FIG. 4, the elastic ring 425 of the lid 405 sits on the outer edge 455, and the outer edge 475 of the steamer insert 410 sits on the lower inner edge 450 of the vessel 415.

In some embodiments, the microwave cooking apparatus has a lid that is coated with an exothermic glaze or a ceramic coat. The coating on the lid further insulates the vessel and generates heat from microwave radiation. In some embodiments, the coating on the lid further provides an upper heat generation layer. This is particularly useful in cases where the cookware is used for baking purposes as heat is coming from all directions of the vessel.

Figure 5:
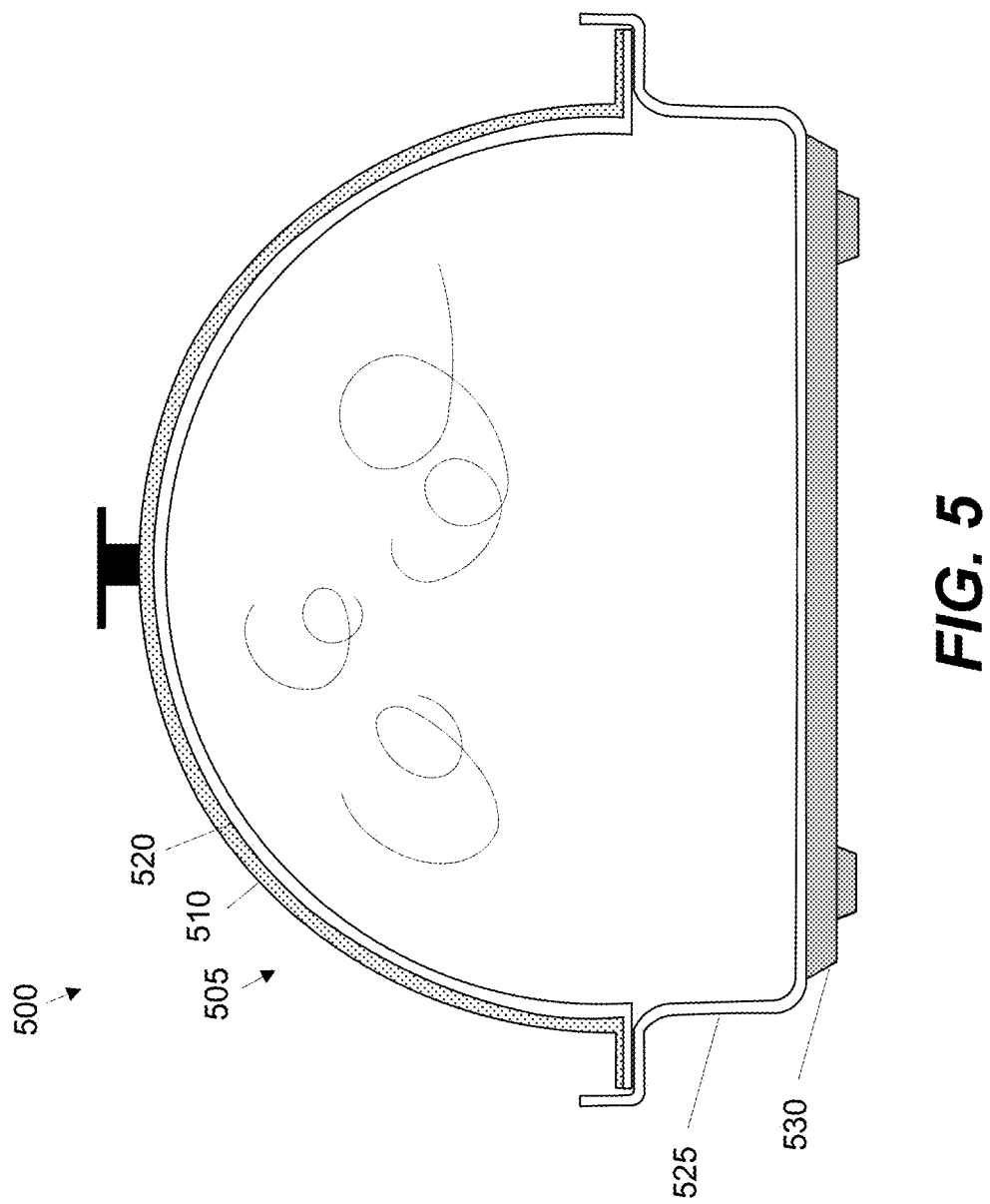
FIG. 5 illustrates another metallic lid of the microwave cooking apparatus according to some embodiments.

FIG. 5 illustrates a lid 505 of the microwave cooking apparatus 500 according to some embodiments of the invention. The figure also illustrates a vessel 525 (i.e., container) that is similar to the one described above by reference to FIG. 1. Attached to the vessel 525 is a heating element 530 that is the same as the one described above by reference to FIG. 1.

As shown in FIG. 5, the lid 505 has a plate 520 that is coated with an exothermic glaze 510 or a ceramic coating. In some embodiments, the lid is coated with an exothermic ceramic coat having exothermic particles. In some embodiments, the exothermic particles have ceramic powder and ferrite. In some embodiments, the exothermic particles also has manganese zinc (MnZn) powder, magnesium copper zinc (MgCuZn) powder, and nickel zinc (NiZn) powder. In some embodiments, the exothermic particles include Fe2O3 powder with Manganese (Mn) and Zinc (Zn) powder, or copper-nickel-zinc (Cu—Ni—Zn) powder for electro-microwave absorption.

In some embodiments, the lid is coated with an exothermic glaze. The glaze of the cookware of some embodiments is a mixed metal alloy powder compound comprising ferrite, silicon (Si), and aluminum (Al). In some embodiments, the exothermic glaze includes a mixed metal powder compound (e.g., Fe2O3) with ferrosilicon (Fe—Si) powder, aluminum silicate powder, and ethylene glycol.

Figure 6:
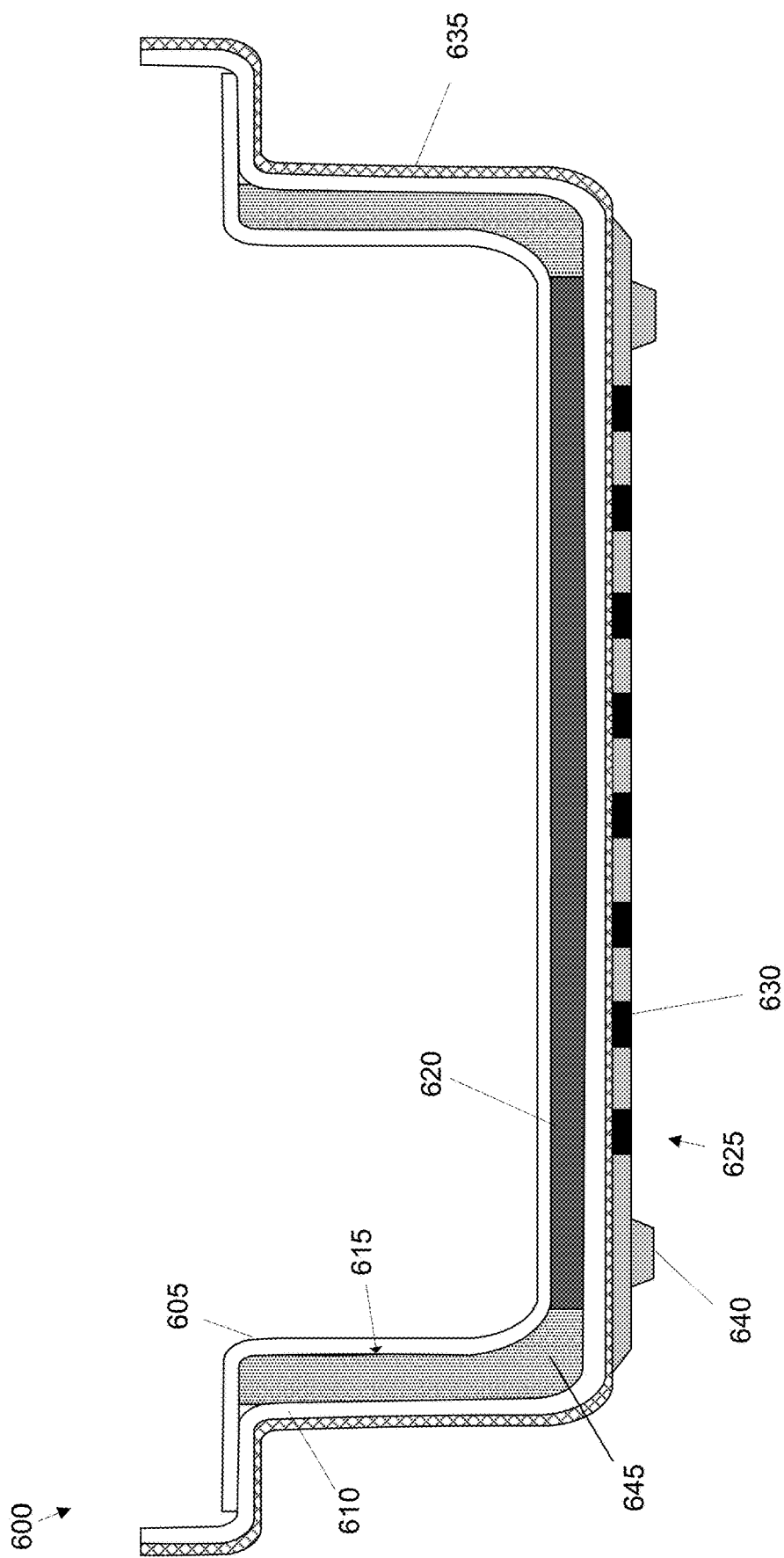
FIG. 6 illustrates a double walled vessel of the microwave cooking apparatus according to some embodiments.

In some embodiments, the microwave cooking apparatus has double wall structure. FIG. 6 illustrates a double walled vessel 600 of the microwave cooking apparatus according to some embodiments. The inner shell 605 is disposed adjacent the outer shell 610 and the edges of the shells are (e.g., hermetically) sealed to form a cavity 615 (also referred to herein as inner space, a thermal dynamic layer, inner chamber) between the two shells. In some embodiments, the cavity 615 is filled at least partially with a thermal conductive medium 645 to form a thermodynamic layer that can absorb and retain heat for an extended period time. In some embodiments, the inner or outer shell is made using at least one of aluminum, stainless steel, carbon steel, copper, and clad metal. The double walled vessel 600 of some embodiments can heat up to about 450° Celsius (C) with a microwave oven.

Different embodiments can use different thermal conductive mediums. In some embodiments, the microwave cookware uses a gaseous medium, such as ambient air. In some embodiments, the inner space is at least partially filled with a compound, such as silicone oil.

In some embodiments, the inner space is at least partially filled with a fibrous medium, such as carbon fiber. The inner space may have a piece of fiberglass woven fabric for insulation. The fiberglass woven fabric may have a honeycomb form. For instance, the fabric can have a number of cells that are similar in appearance to those of a bee's honeycomb. The honeycomb fiberglass fabric may be used because it is lightweight, fire resistant, flexible, and has good impact resistance.

In some embodiments, the fibrous medium includes ceramic wool fiber for insulation. In some embodiments, the inner space has a piece of material made with ceramic fiber. In some embodiments, the inner space the material is a ceramic fiber blanket or mat. The blanket is a lightweight, thermally efficient ceramic fiber insulating material that has dimensional stability at high temperature. In some embodiments, the blanket is made from high-purity alumina, zirconia, and silica spun ceramic fibers. In some embodiments, the blanket has a temperature grade around or above 760° Celsius (C).

In some embodiments, the fibrous medium includes glass cloth.

In some embodiments, the inner space 615 includes a quilted panel. The panel may be made using glass cloth. The panel may be sewn into a pillow-like shape and filled with silica powder mixture. The panel may be sewn first closed and then compressed. The sewing technique allows the panel to be flexible. For instance, the quilted panel can be wrapped around the outer side wall of the inner shell of the double-walled vessel. The panel can also withstand abuse that the cookware is subject. That is, the panel is resistant to various vibration and motion of the vessel. Depending on the size of the inner chamber, the thicknesses of the panel may change.

In some embodiments, inner space 615 contains a thin sheet of micro-porous insulation material. The thin sheet may be made with a micro-porous board material. As the board can be delicate, it might be coated in some manner to reinforce the board material. The thin sheet may be made primarily with pyrogenic silica. The thin sheet may be reinforced in some manner (e.g., with e-glass filament, oxide opacifier, etc.).

In some embodiments, the inner space 615 includes a piece of foam to keep food items hot for several hours. In some embodiments, the foam is made of polyurethane. In some embodiments, the inner space is at least partially filled with a chemical gel. In some embodiments, the chemical gel includes ammonium nitrate, calcium chloride, sodium chloride, sodium acetate, and ammonium chloride. One of the benefits of using such a gel is for its endothermic performance or its ability to absorb heat. That is, the gel can be used to keep food cold for an extended period of time.

As shown in FIG. 6, the inner space may be fully filled with the thermal conductive medium. As a first example, the inner space may be filled with the above-mentioned fibrous medium. As another example, the inner space may be filled with the thin sheet of microporous material.

In some embodiments, the inner space is at least partially filled with a set of one or more thermal conductive pads. The inner space can be filled at least partially with a thermal conductive gel. For faster heat absorption and transfer, the inner space may include a silicone-based material that is mixed with an aluminum oxide compound. In some embodiments, the inner space is at least partially filled with a silicone rubber having ferrite particles (e.g., manganese zinc (MnZn) ferrite particles).

In some embodiments, the cookware 600 has pressure relief valve installed on the outer shell. This is to relive pressure built up in the cavity 615 between the inner and outer shells 605 and 610.

In some embodiments, the microwave cooking apparatus 600 has an exothermic plate 620. The exothermic plate 620 generates and transfers heat. In some embodiments, the exothermic plate 620 is placed in the cavity between the inner and outer shells. In particular, the plate is placed between the outer bottom surface of the inner shell and the inner bottom surface of the outer shell. In some embodiments, the plate makes contact with both shells to transfer heat to both shells. In some embodiments, the outer shell 610 has an opening (e.g., an open circle) to expose the plate 620 to microwave radiation.

In some embodiments, the exothermic plate 620 is formed with exothermic clay ceramic. In some embodiments, the ceramic clay has ferrite powder. In some embodiments, the plate has clay ceramic powder mixed with iron oxide powder ($Fe_2O_3$) powder and magnesium-Zinc (Mn—Zn) silicate powder. In some embodiments, the plate is made with clay ceramic powder mixed with iron (III) oxide powder ($Fe_2O_3$) powder and copper-nickel-zinc (Cu—Ni—Zn) powder for electro-microwave absorption. In some embodiments, the clay ceramic includes at least one of manganese zinc (MnZn) powder, magnesium copper zinc (MgCuZn) powder, and nickel zinc (NiZn) powder. Instead of $Fe_2O_3$, some embodiments use $Fe_3O_4$ (iron (II,III) oxide) powder. In some embodiments, the plate is made of ferrite silicone mixture and $Fe_3O_4$ powder.

FIG. 6 also shows a heating element 625 according to some embodiments of the invention. The heating element 625 is similar to the one described above by reference to FIG. 1. However, in FIG. 6, the heating element 625 includes a number of vent holes 630. A set of one or more vent holes 630 can be formed on the elastic heating element to prevent disfigurement of the heating element. Also, when there is an opening along the bottom of the outer shell, heated air or moisture can come out of the cavity through the vent holes.

Further, as shown in FIG. 6, the heating element 625 may be supported or raised by a number of supporting members 640 or legs. In some embodiments, the supporting members 640 are formed on the bottom of the heating element.

In some embodiments, the cookware's vessel is covered at least partially with a thermal exothermic layer 635. In some embodiments, the layer serves multiple purposes. The layer may insulate the vessel by trapping heat. The layer may make the vessel safe to touch when heated. Different embodiments use different materials for the outer layer. In some embodiments, the outer layer has heat resistance up to and excess of 260° C. In some embodiments, the layer is composed of polystyrene such as syndiotactic polystyrene (SPS) plastic. In some embodiments, the layer is composed of a polymer such as polyphenylene sulfide (PPS) plastic. In some embodiments, the layer is made using silicone rubber. To enhance the exothermic properties of the vessel, the PPS, SPS, or silicone rubber may be mixed with exothermic particles.

In some embodiments, the cookware's outer shell is coated with an exothermic glaze or exothermic ceramic coat. The glaze or coat may be covered over with PPS or SPS plastic. The glaze or coat may be covered with a piece of silicone rubber. The PPS plastic, SPS plastic, or silicone rubber material may be mixed with exothermic particles for additional exothermic performance.

In some embodiments, the inner space of the multi-layered container 600 is at least partially filled with a reactive medium or material that absorbs one or more different gaseous mediums, such as the ambient air mentioned above, and holds the gaseous mediums for an extended period of time. This is to improve and maintain a vacuum inside the sealed inner space. The reactive material of some embodiments can absorb different types of gas molecules, such as H2O, O2, N2, CO, CO2, etc.

When a gaseous medium makes contact with the reactive material, the gaseous medium is combined with the reactive material through a chemical reaction. The reactive material essentially absorbs or eliminates even small amounts of gas molecules from the inner space. In some embodiments, the reactive material is getter that can absorb heated air and retain it for several hours. In some embodiments, a deposit of getter material is placed in the inner space of the multi-layered container. In some embodiments, the getter comprises zirconium (Zr). In some embodiments, the getter is primarily zirconium-based in amount or volume but can include one or more other elements, e.g., aluminum (Al), cobalt (Co), iron (Fe), etc.

Figure 7:
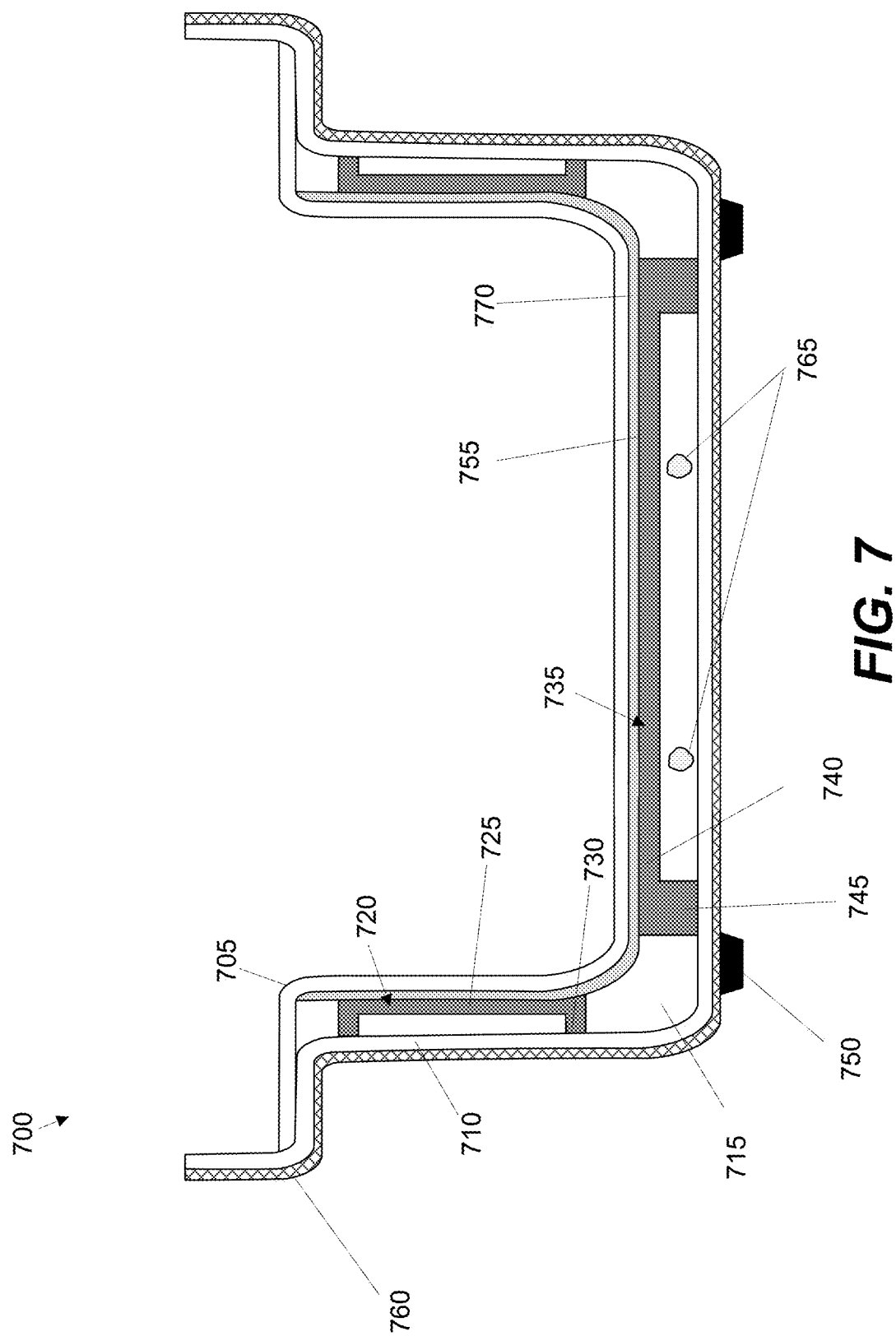
FIG. 7 illustrates a double walled vessel of the microwave cooking apparatus according to some embodiments.

In some embodiments, the reactive material is injected or placed in the inner chamber of the multi-layer container with one or more of the thermal conductive material listed above. FIG. 7 illustrates a container of the microwave cooking apparatus according to some embodiments. Specially, the figure shows a thermodynamic layer 715 that has getter 765. In the illustrated example, the microwave cooking container 700 is a thermal microwave cooking vessel in that it can retain heat for an extended period of time.

When the multi-layered container 700 is heated, the air within the thermodynamic layer 715 is heated, and the air molecules are absorbed by getter 765. The getter 765 can retain the heated air for several hours, similar to a thermal flask. For instance, when getter 765 is placed in the thermodynamic layer with ambient air, the multi-layered container may remain heated for about 5 to 6 hours. In some embodiments, the inner space has getter and ambient air. In some embodiments, the inner space has getter and silicone oil. In some embodiments, the inner space has getter and a fibrous medium (e.g., ceramic wool). In some embodiments, the inner space 715 has getter 765 and one or more other thermal conductive mediums described above by reference to FIG. 6.

In some embodiments, the thermal microwave cooking vessel 700 has a set of one or more support structures 720 and 735. In some embodiments, a support structure (720 or 735) is made with a piece of silicone rubber. The support structures 720 and 735 prevent the disfigurement of the inner and outer shells. Therefore, they protect the integrity of the thermal dynamic layer 715. Each support structures can include a surface area (725 or 755) that is supported by a bottom support member (730 or 745). In some embodiments, the cookware includes a round support structure 720 that fits around the inner shell 705. The surface area 725 730 may be in contact with the outer side wall of the inner shell 705. The support member 730 may be in contact with the inner side wall of the outer shell 710.

In some embodiments, the cookware 700 includes a plate-like support structure 735 that is disposed in between the outer bottom surface of the inner shell 705 and the inner bottom surface of the outer shell 710. The top 755 of the support plate 735 may make contact with the outer bottom surface of the inner shell 705. One or more bottom support members 745 may be formed on the plate 735. The bottom support member 745 may touch the inner bottom surface of the outer shell 710.

In some embodiments, the cookware's inner shell 705 is covered at least partially with an exothermic glaze 770 or a ceramic coat that is described above by reference FIGS. 1 and 2. In the example of FIG. 7, the outer bottom surface and the outer side wall of the inner shell 705 is coated with the exothermic glaze 770. In some embodiments that coat the inner shell 705, there can be an open region in the outer shell 710. The opening exposes the exothermic glaze 770 to microwave radiation. In some embodiments, the opening is a round circle along the bottom surface of the outer shell 710.

As indicated above, in some embodiments, the cookware's outer shell 710 is covered at least partially with a thermal exothermic layer 760. The exothermic layer 760 is described above by reference to FIG. 6. Finally, in the example of FIG. 7, a number of legs 750 are attached to the double walled container 700.

Figure 8:
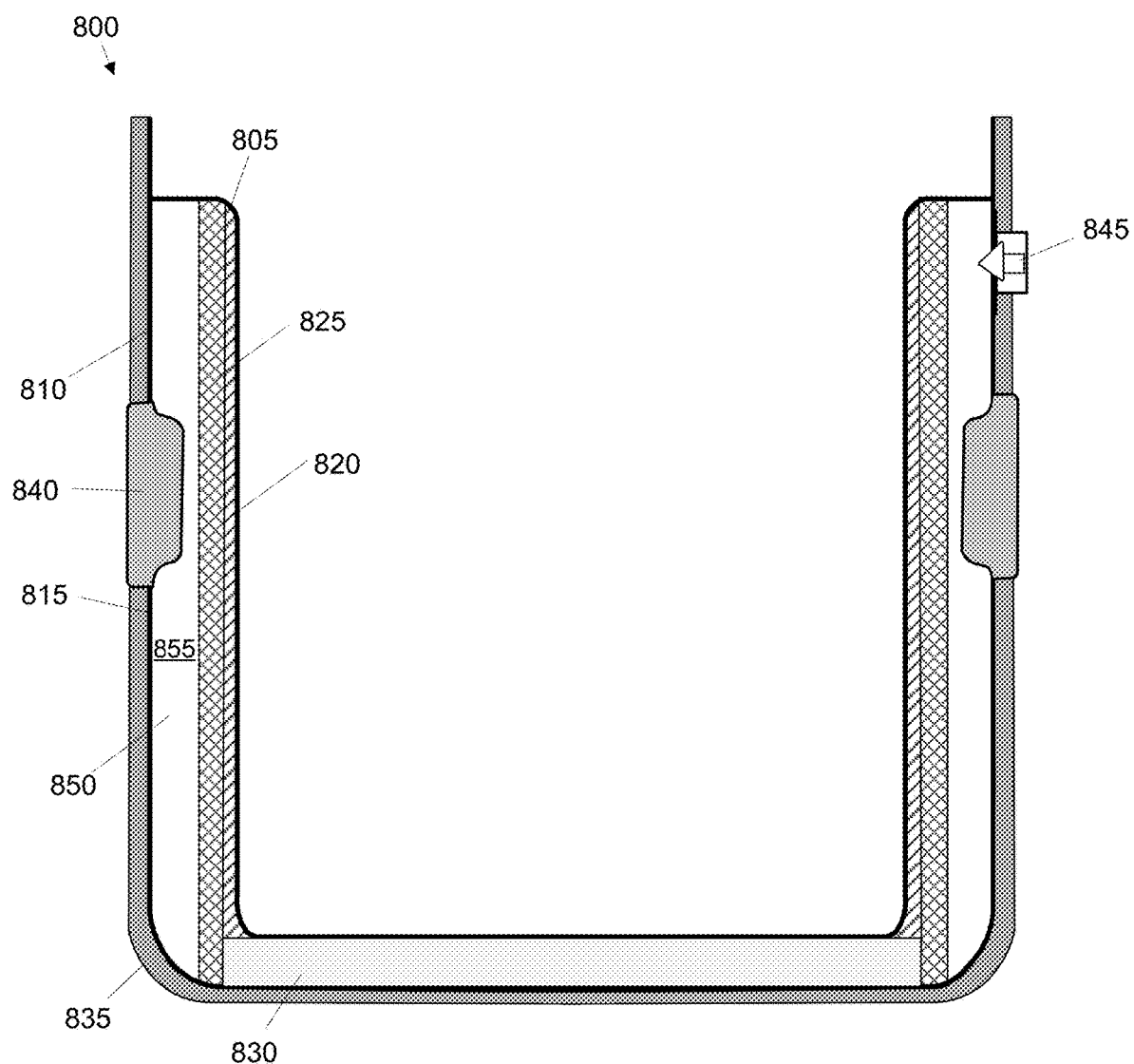
FIG. 8 illustrates a double walled vessel of the microwave cooking apparatus according to some embodiments.

In some embodiments, the cookware's thermal dynamic layer has a piece of ferrite rubber to insulate the vessel. FIG. 8 illustrates a double walled vessel 800 of the microwave cooking apparatus with such a thermal dynamic layer 850. As shown, the inner shell 805 is disposed adjacent the outer shell 810, and the edges of the shells are (e.g., hermetically) sealed to form the thermal dynamic layer 850 between the two shells. In some embodiments, the inner or outer shell is made using at least one of aluminum, stainless steel, carbon steel, copper, and clad metal.

In some embodiments, the cavity 850 is filled at least partially with a thermal conductive medium to form a thermodynamic layer that can absorb and retain heat for an extended period time. As mentioned above, different embodiments can use different thermal conductive mediums. In the example of FIG. 8, to absorb and transfer heat, the thermodynamic layer 850 includes a piece of ferrite rubber 820 and a piece of fibrous material 825. The ferrite rubber may be attached (e.g., glued) to the surface of one of the two shells (805 or 810). For instance, the piece of ferrite rubber 820 is attached to the outer surface of the inner shell 805. The rubber 820 may wrap around the inner shell 805 as illustrated in the figure.

In some embodiments, the rubber 820 is attached to the outer side wall and/or the outer bottom surface of the inner shell 805. In conjunction with the inner shell or instead of it, a piece of ferrite rubber may be attached to the inner surface of the cookware's outer shell 810. In some embodiments, instead of ferrite rubber, the cookware uses a different material (e.g., PPS or SPS with exothermic particles). In some embodiments, the cookware uses silicone rubber with exothermic particles.

In some embodiments, the inner chamber 850 includes multiple layers of different materials. For instance, in the example of FIG. 8, the cavity 850 includes a layer of ferrite rubber 820 and a layer of fibrous material 825. In some embodiments, the fibrous material 825 is ceramic wool or fiberglass wool to increase thermal conductivity for about 4-5 hours. One of the reasons for using such wool is because of its ability to remain stable in a high-temperature setting. Also, the wool is used because of its thermal insulation performance. In some embodiments, the inner chamber 850 has a piece of foam to keep food items hot for several hours. In some embodiments, the foam is made of polyurethane.

As mentioned above, in some embodiments, the inner chamber includes a fibrous medium, such as ceramic wool. In some embodiments, the inner chamber 850 includes a quilted panel or a thin bendable board made of microporous material. In some embodiments, the thermal conductive medium 825 may be attached in some manner to the ferrite rubber 825. As illustrated, there may be a space or an area 855 in the inner chamber 850 to hold a pocket of air. The air may act as a third insulating member in addition to the rubber 820 and the medium 825. The space also allows the materials 820 and 825 to expand when the vessel is heated. In some embodiments, the thermal conductive medium 825 (e.g., the quilted panel, the thin sheet) may fill out the remaining area next to the ferrite rubber 825.

In some embodiments, the inner chamber 850 is at least partially filled with a chemical gel. In some embodiments, the chemical gel includes ammonium nitrate, calcium chloride, sodium chloride, sodium acetate, and ammonium chloride. One of the benefits of using such a gel is for its endothermic performance or its ability to absorb heat. That is, the gel can be used to keep food cold for an extended period of time.

In some embodiments, the cookware's outer shell 810 is covered with a layer of material to insulate the vessel and to make the vessel safe to handle. In the example of FIG. 8, the outer surface and the handle area of the outer shell 810 are covered with layers of heat insulating materials. Specifically, the figure shows an outer cover 835 and a set of cool touch handles 840 that insulate the vessel and make it safe to touch. In some embodiments, the thermal insulating member (835 or 840) is made of a polymer such as polyphenylene sulfide (PPS). In some embodiments, the thermal insulating member (835 or 840) is made with PPS plastic. In some embodiments, the thermal insulating member is made of silicone rubber. In some embodiments, the PPS plastic, SPS, or silicone rubber may be exothermic in that it was mixed with exothermic particles. In some embodiments, the outer cover 835 has exothermic particles while the handle 840 does not have such particles.

In the example of FIG. 8, the outer cover 835 covers the outer surface of the outer shell 815. For instance, the outer side wall and the outer bottom surface of the outer shell are surrounded by the cover layer 835. As will be described below by reference to FIG. 9, the cover layer may only cover the bottom portion of the outer shell.

In some embodiments, the microwave cooking apparatus 800 has an exothermic plate 830. In some embodiments, the exothermic plate 830 is a ceramic plate. Alternatively, the exothermic plate can be a clay plate (e.g., clay ceramic plate). For exothermic performance, the clay plate may be blended with ferrite (Fe) powder, and manganese (Mn) and zinc (Zn) silicate powder.

Finally, as shown in FIG. 8, the cookware 800 of some embodiments has a pressure release valve 845. There is a hole in the outer shell 810. The valve 845 covers that hole and lets out excess pressure built up within the inner chamber 850 of the doubled walled vessel.

Figure 9:
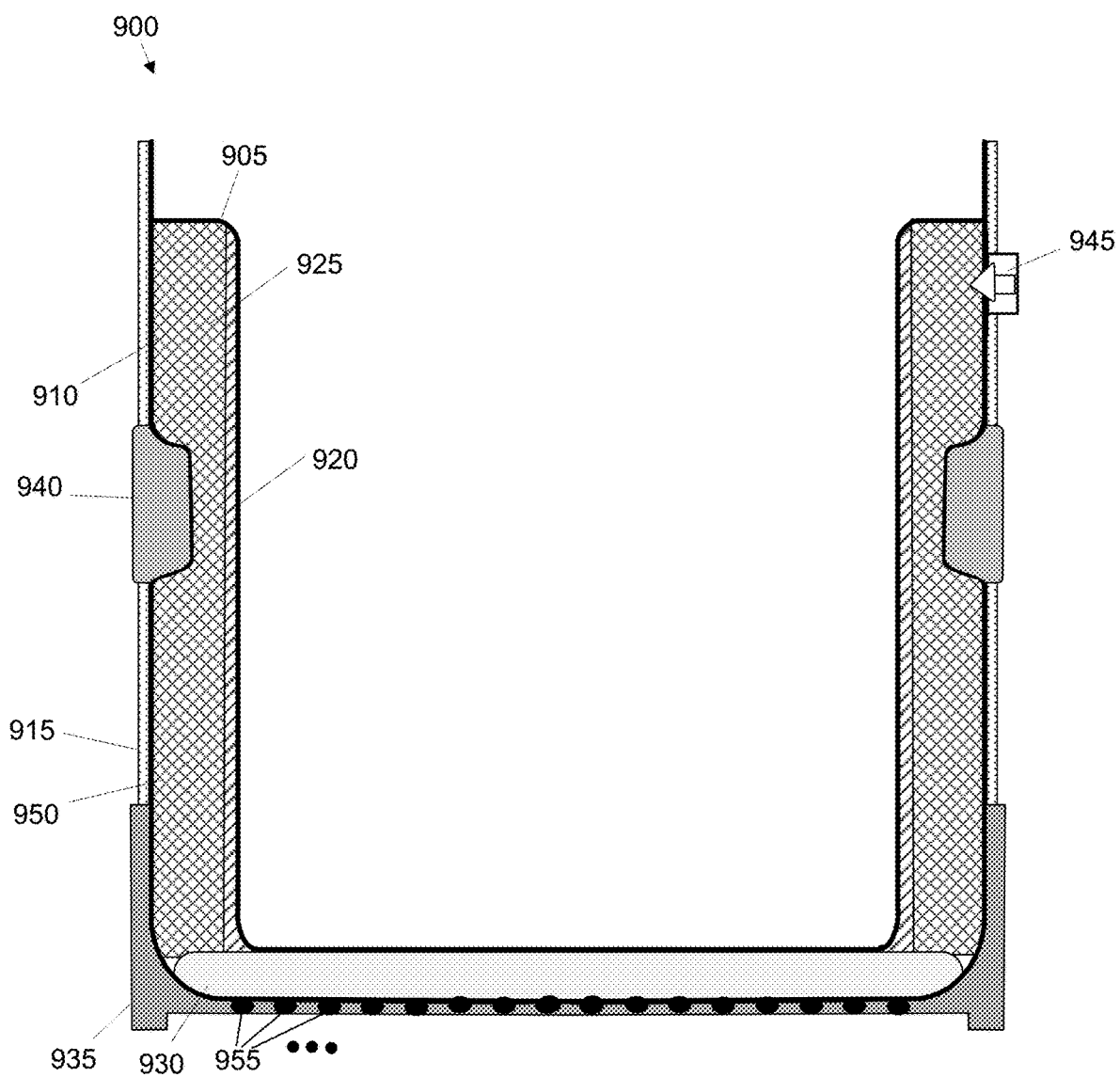
FIG. 9 illustrates a double walled vessel of the microwave cooking apparatus according to some embodiments.

FIG. 9 illustrates yet another example of a microwave cooking apparatus 900 according to some embodiments of the invention. This figure is similar to the previous figure. Different from the previous figure, the current figure shows that at least a portion of the cookware's outer surface of the inner shell 910 is coated with an exothermic powder coat 920 and at least a portion of the outer surface of the outer shell is coated with a ceramic coat 915. Each coating (910 or 915) may include Fe, Mn, and Zn as exothermic particles.

Also different from the previous figure, FIG. 9 shows that only the outer bottom surface of the cookware 900 and the handle area can be covered with layers of heat insulating materials. The previous figure showed that the entire side wall can be covered with the cover layer 935. For instance, if some type of plastic is used, it may only cover the outer bottom surface and/or the handle area.

Further, different from the previous figure, the thermal conductive medium 925 (e.g., the quilted panel, the thin sheet) fills out the remaining area next to the ferrite rubber 925. Further, different from the previous figure, FIG. 9 shows that the cookware 900 of some embodiments has an outer bottom cover 935 with a number of vent holes 955. The outer bottom cover may be made from PPS plastic. PPS plastic is used because it has high heat resistance. The PPS may be exothermic in that it is mixed with exothermic particles. In some embodiments, the outer bottom cover is made with silicone rubber.

Similar to the previous figure, FIG. 9 shows that the inner chamber of the vessel can include a piece of fibrous material 920. Further, the cookware 900 can have a set of one or more cool touch handles (e.g., made of silicone rubber that wraps around the outer surface of the outer shell 910). In addition, the cookware can have a safety valve 945 to relieve excess pressure within the inner chamber 950.

Figure 10:
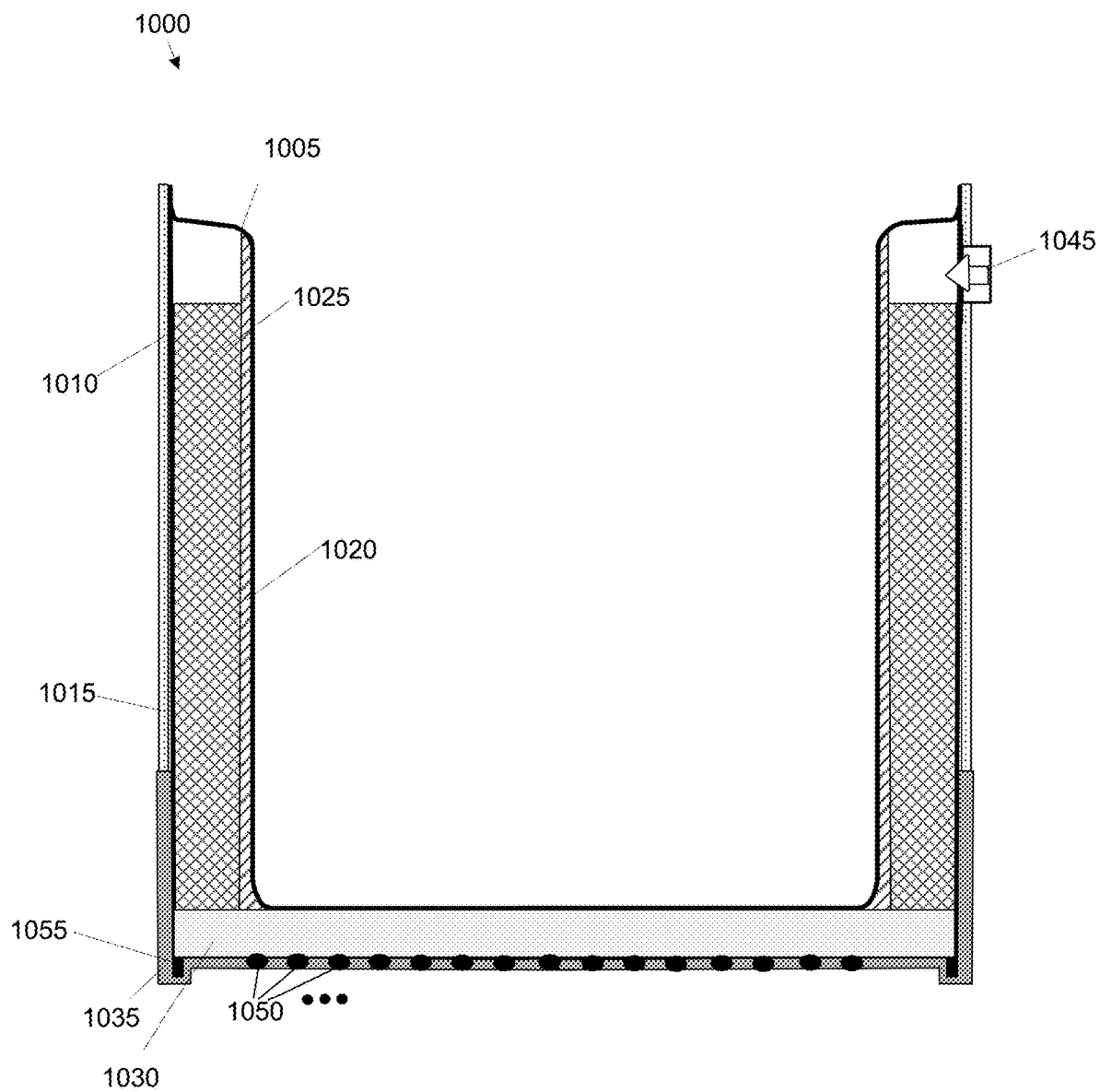
FIG. 10 illustrates a double walled vessel of the microwave cooking apparatus according to some embodiments.

FIG. 10 illustrates yet another example of a microwave cooking apparatus 1000 according to some embodiments of the invention. This figure is similar to the previous figure. The main differences between the current figure and the previous figure are that the cookware 1000 shown in the current figure is footed. That is, a set of one or more bottom support members 1035 is attached to or formed on the outer bottom surface of the outer shell. Also, the cookware of FIG. 10 does not have the set of cool touch handles 940.

Figure 11:
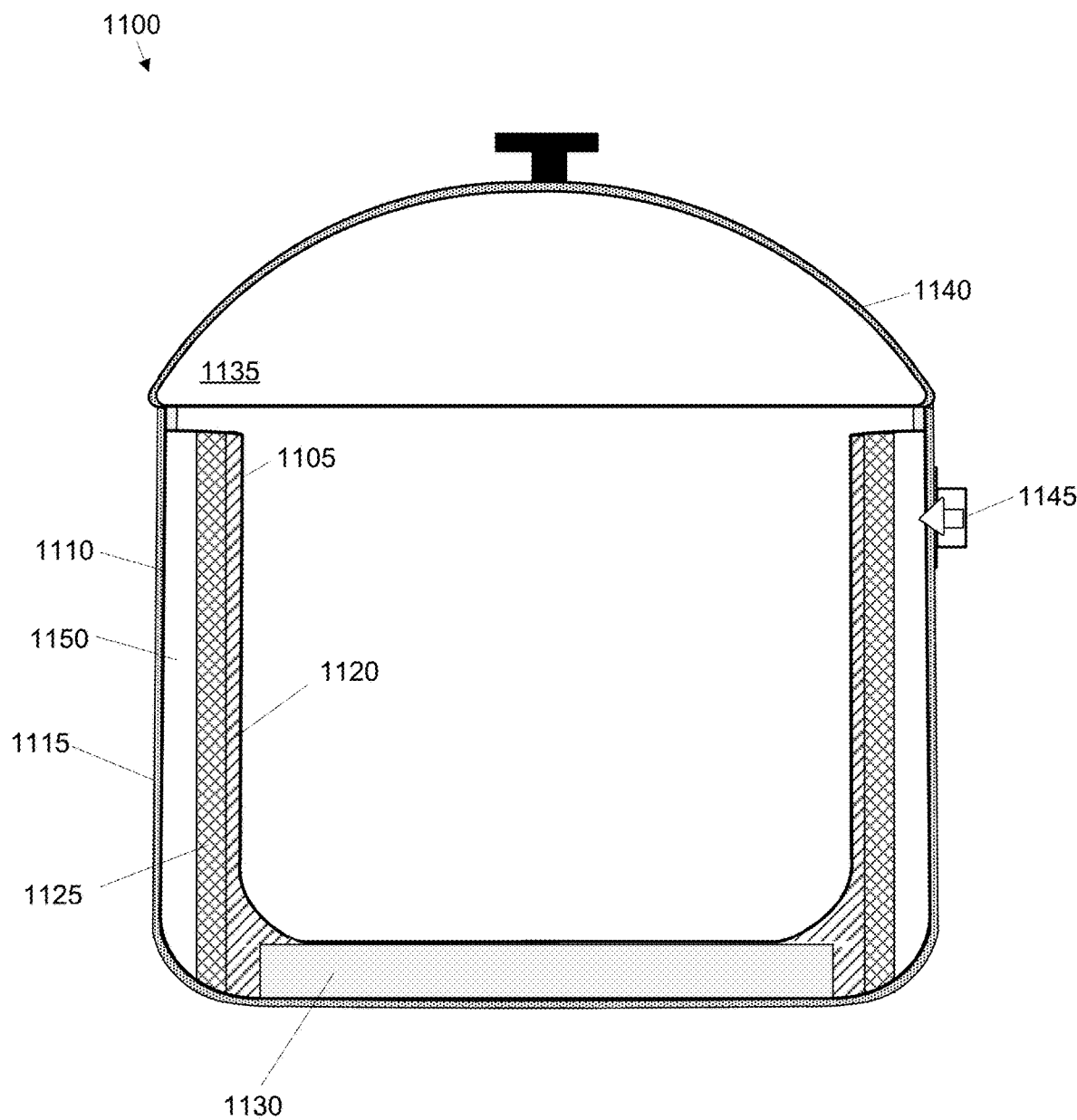
FIG. 11 illustrates a double walled infrared cookware according to some embodiments.

FIG. 11 illustrates yet another example of a microwave cooking apparatus 1100 according to some embodiments of the invention. As shown, the cookware's inner shell 1105 is wrapped with a piece of ferrite rubber 1120. The rubber may 1120 be attached to a portion of the outer surface of the inner shell 1105. The cookware 1100 also has a piece of fibrous material 1125 (e.g., ceramic wool fiber, fiberglass woven fabric, etc.) for added insulation. The outer surface of the cookware is also coated with an exothermic ceramic coat. In the example of FIG. 11, the coating 1115 is on the outer surfaces of the lid 1135 and outer shell 1110. FIG. 11 also shows that the cookware 1100 of some embodiments has a pressure release valve 1145 and an exothermic ceramic or clay ceramic plate 1130.

Figure 12:
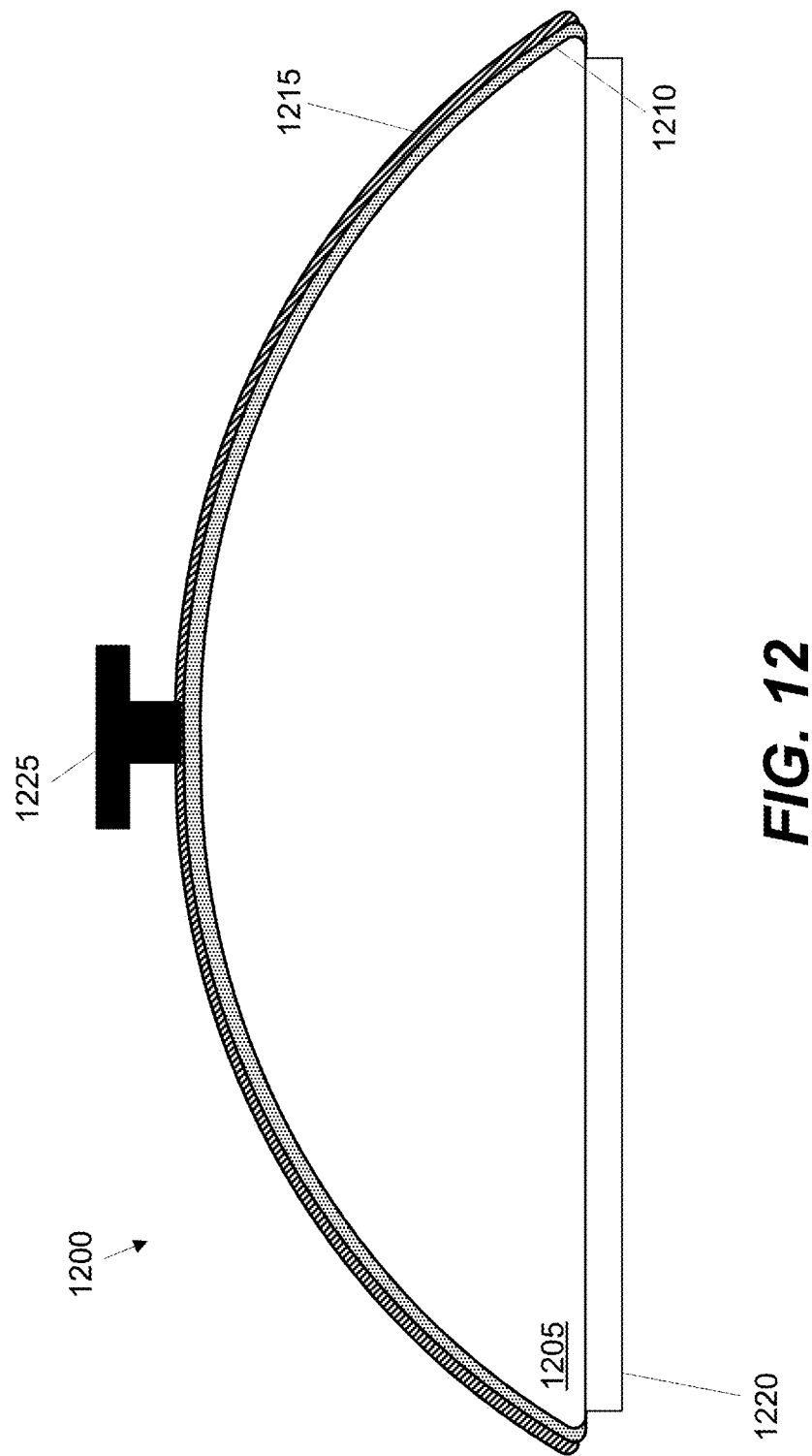
FIG. 12 shows an exothermic infrared cover according to some embodiments of the invention.

In some embodiments, the cookware includes an exothermic infrared cover that generates and traps heat. FIG. 12 shows such an exothermic infrared cover 1200 according to some embodiments of the invention. As shown, the cover 1200 includes at least one exothermic layer 1215. In some embodiments, the exothermic layer 1215 has a layer of ferrite rubber. The rubber may be coated on or attached to the outer surface of the plate 1205 of the cover 1200. In some embodiments, the exothermic layer 1210 is an exothermic ceramic coat.

In some embodiments, the cover 1200 includes a heat-resistant outer layer 1215 (e.g., thermal insulation layer). The heat-resistant outer layer 1215 may cover the exothermic layer 1210. In some embodiments, the heat-resistant outer layer 1215 serves multiple purposes. The heat-resistant outer layer may insulate the vessel by trapping heat. The heat-resistant outer layer 1215 may make the cover 1200 safe to touch when heated. Different embodiments use different materials for the heat-resistant outer layer. In some embodiments, the heat-resistant layer is composed of polystyrene such as syndiotactic polystyrene (SPS). In some embodiments, the heat-resistant layer is composed of a polymer such polyphenylene sulfide (PPS). The vessel of some embodiments uses such a polystyrene or polymer because it has heat resistance up to and excess of 260° C.

In some embodiments, the lid has a disk 1205 made of PPS plastic. In some embodiments, the lid has a disk made with SPS plastic. In some embodiments, the lid has a disk made with silicone rubber. The PPS plastic, SPS plastic, or silicone rubber may be mixed with exothermic particles.

In some embodiments, the exothermic particles include Fe2O3 powder with Manganese (Mn) and Zinc (Zn) powder, or copper-nickel-zinc (Cu—Ni—Zn) powder for electro-microwave absorption. In some embodiments, the lid has a metal disk made of stainless steel, aluminum, or carbon steel.

Figure 13:
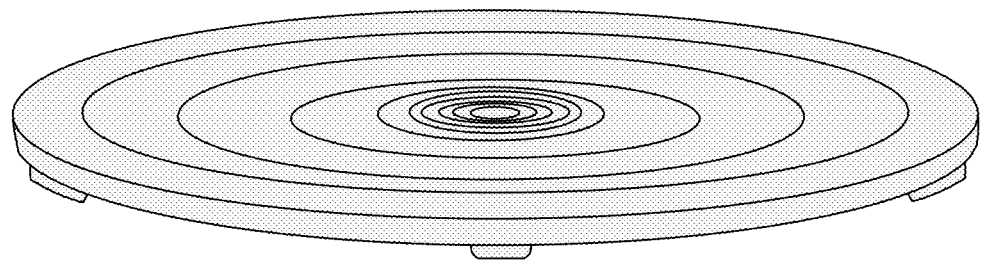
FIG. 13 illustrates a heating element of the microwave cooking apparatus according to some embodiments.

As mentioned above, the multi-purpose microwave cookware of some embodiments has an elastic heating element. FIG. 13 illustrates a heating element 1300 of the microwave cooking apparatus according to some embodiments. The heating element 1300 has a top face and a bottom face, and the top face attached to the outer bottom surface of the microwaveable vessel. In some embodiments, the heating element 1300 is attached to the outer bottom surface by a heat press process. The heat press process can include the following steps: applying a layer of adhesive to the outer bottom surface of the vessel, drying the vessel for about an hour in an area having a temperature about 180° C. and pressing the heating element onto vessel at temperatures ranging between 150-250° C. This heat-press process removes excess water, minimizes shrinkage, and ensures greater resistance to high temperature, moisture, and physical abuse.

In some embodiments, the heating element 1300 is ferrite rubber, which is a mixture of ferrite particles having the general chemical formula MOFe2O3, where MO is one or more divalent metal oxides combined with 48 to 60 mole percent of iron oxide, and elastic material. In some embodiments, the elastic material is silicon rubber capable of withstanding temperatures up to at least the transitional temperature of the ferrite particles, which is temperature marking the change of the particles from a ferromagnetic to paramagnetic state. In some embodiments, the elastic material is silicon rubber capable of withstanding at least 260° Celsius (C).

The use of ferrite rubber as a heating element 1300 offers several advantages over coating a vessel with ferrite particles. First, it is durable in that it is flexible and strong enough to be used in demanding conditions such as in a microwave oven or in a sink. It is also durable in that it protects the magnetic properties of the ferrite particles by being moisture resistant. Secondly, it is moldable in that it can be molded into varying shape or size. For example, in some embodiment, several legs are molded or formed on the bottom face of the heating element 1300. This eliminates the manufacturing steps of separately attaching the legs onto the bottom face of the heating element.

Figure 14:
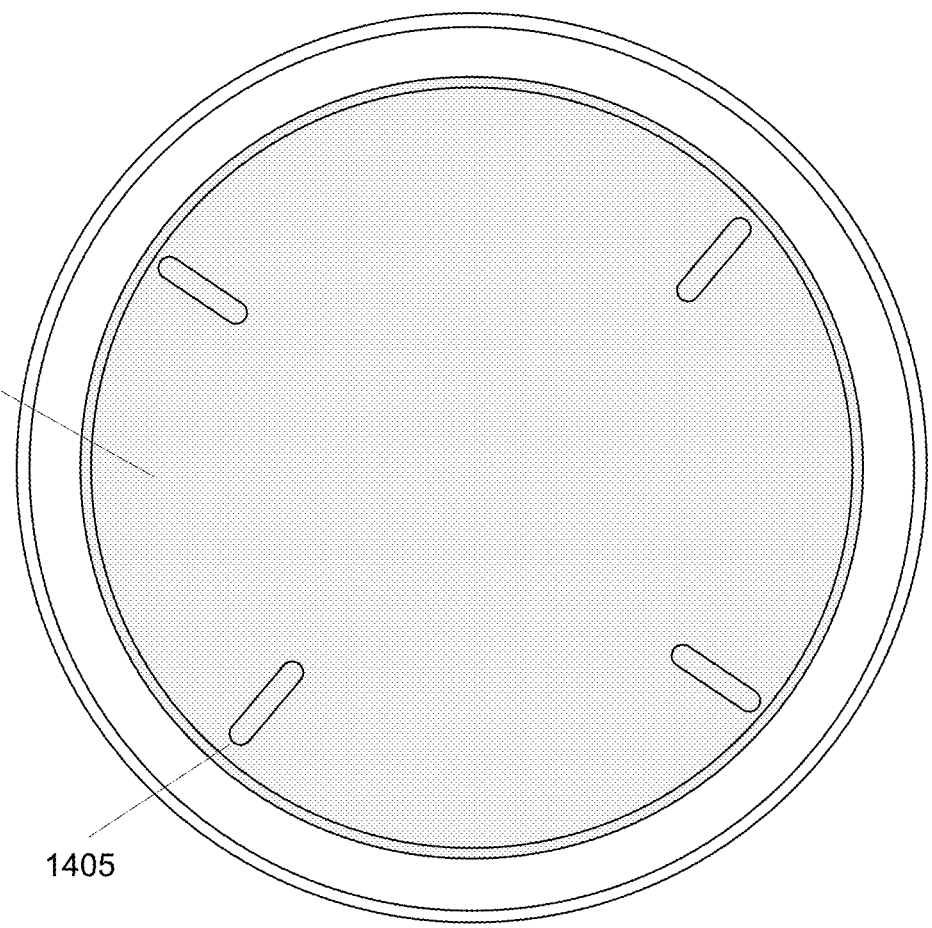
FIG. 14 illustrates a bottom plan view of the heating element of FIG. 13.

FIG. 14 illustrates a bottom plan view of the heating element of FIG. 13. Provided on the bottom face 1400 of the heating element 1400 is a plurality of thermal insulating members 1405 or legs. In some embodiments, at least four legs are geometrically arranged or formed on the bottom face of the heating element 1400 to provide support for the vessel 1410. The thermal insulating members 1405 are narrow-shaped so as to make minimal contact with the inner surface or turntable of the microwave oven, and thus provide insulation to the vessel by ensuring that the thermal energy stored in the heating element 800 is not rapidly transferred to the inner surface of the microwave oven.

Figure 15:
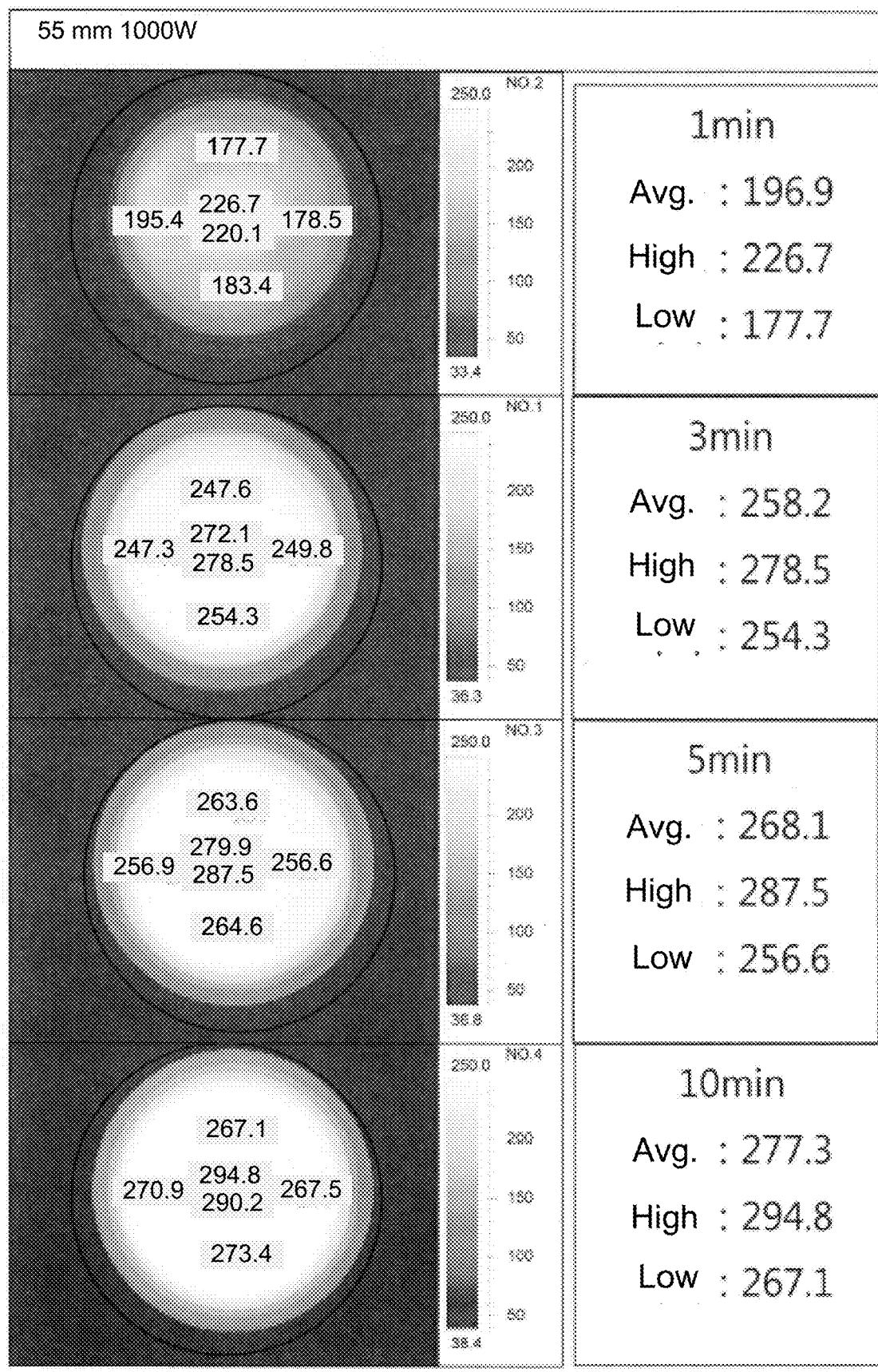
FIG. 15 shows the results of a first exothermic test performed on a microwave vessel with a piece of ferrite rubber.

FIG. 15 shows the results of an exothermic test performed on a microwave vessel with a piece of ferrite rubber. Specifically, this figure shows an exothermic test for a pan that has a diameter of 55 mm. The ferrite rubber is the primary heating element for the test. The test was performed with a 1000 Watt (W) microwave oven. The results show the temperature in degrees Celsius (C).

As shown in FIG. 15, the results include four sets of data. The first set of data has temperature measurements after heating the vessel for just 1 minute with the microwave oven. The average temperature was measured at 196.9° C. The high temperature was measured at 2267° C. The high was based on a temperature reading from the center of the pan. The low temperature was measured at 177.7° C. The low was based on a temperature reading from the outer edge of the pan. The first set of data also includes a graphical representation of the pan with the temperature reading of the different areas around the pan.

The second set of data has temperature measurements after heating the vessel for 3 minutes with the microwave oven. The average temperature was measured at 258.2° C. The high temperature was measured at 278.5° C. The high was based on a temperature reading from the center of the pan. The low temperature was measured at 254.3° C. The low was based on a temperature reading from the outer edge of the pan. The second set of data also includes a graphical representation of the pan with the temperature reading of the different areas around the pan.

The third set of data has temperature measurements after heating the vessel for 5 minutes with the microwave oven. The average temperature was measured at 268.1° C. The high temperature was measured at 287.5° C. The high was based on a temperature reading from the center of the pan. The low temperature was measured at 256.6° C. The low was based on a temperature reading from the outer edge of the pan. The third set of data also includes a graphical representation of the pan with the temperature reading of the different areas around the pan.

The fourth set of data has temperature measurements after heating the vessel for 10 minutes with the microwave oven. The average temperature was measured at 277.3° C. The high temperature was measured at 294.8° C. The high was based on a temperature reading from the center of the pan. The low temperature was measured at 267.1° C. The low was based on a temperature reading from the outer edge of the pan. The fourth set of data also includes a graphical representation of the pan with the temperature reading of the different areas around the pan.

Figure 16:
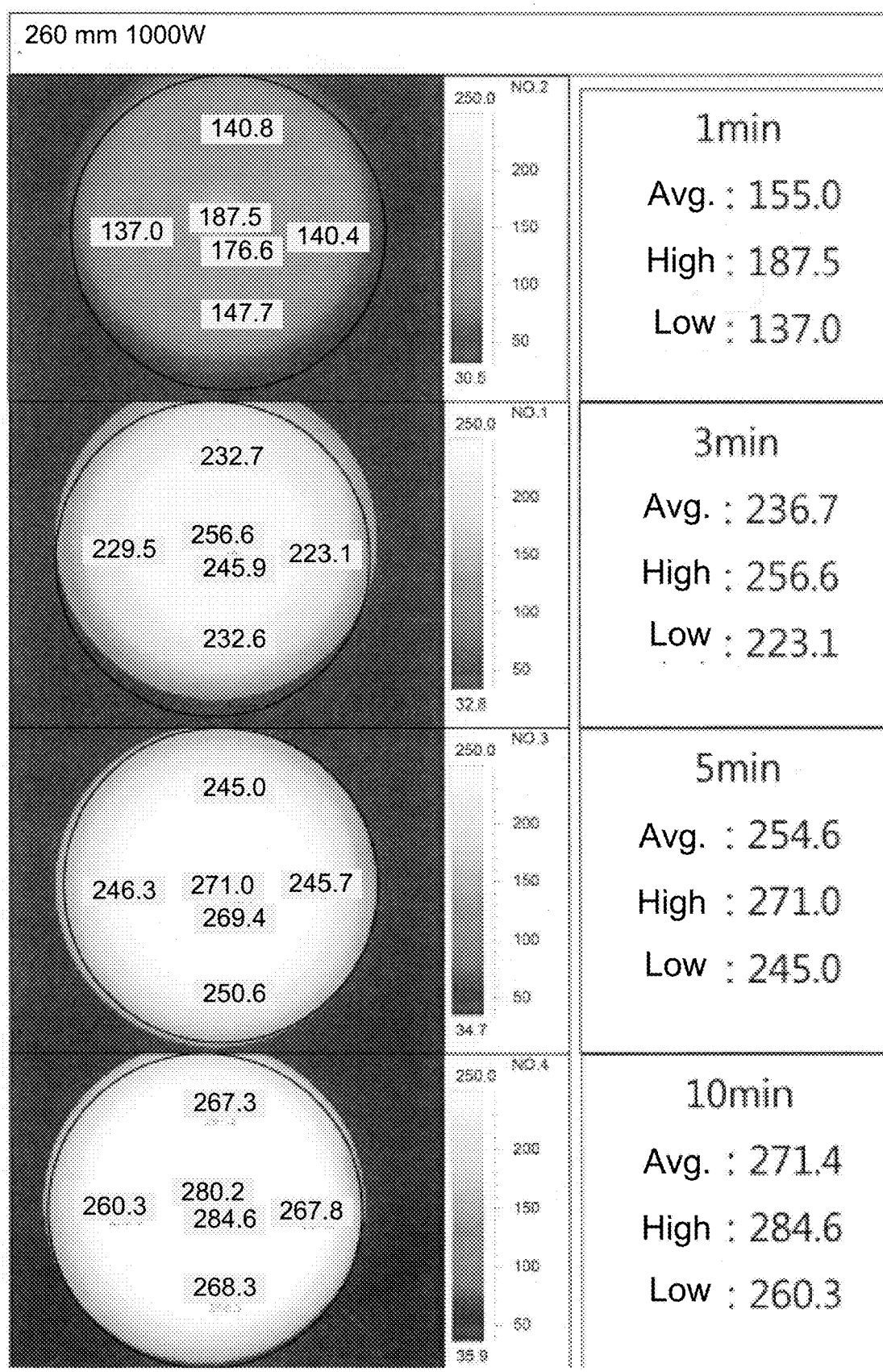
FIG. 16 shows the results of a second exothermic test performed on another microwave vessel with a piece of ferrite rubber.

FIG. 16 shows the results of a second exothermic test performed on a second microwave vessel with a piece of ferrite rubber. Specifically, this figure shows an exothermic test for a pan (e.g., a pizza pan) that has a diameter of 260 mm. The ferrite rubber is the primary heating element for this second text test. The test was performed with a 1000 Watt (W) microwave oven. The results show the temperature in degrees Celsius (C).

As shown in FIG. 16, the results include four sets of data. The first set of data has temperature measurements after heating the vessel for just 1 minute with the microwave oven. The average temperature was measured at 155.0° C. The high temperature was measured at 187.5° C. The high was based on a temperature reading from the center of the pan. The low temperature was measured at 137.0° C. The low was based on a temperature reading from the outer edge of the pan. The first set of data also includes a graphical representation of the pan with the temperature reading of the different areas around the pan.

The second set of data has temperature measurements after heating the vessel for 3 minutes with the microwave oven. The average temperature was measured at 236.7° C. The high temperature was measured at 256.6° C. The high was based on a temperature reading from the center of the pan. The low temperature was measured at 223.1° C. The low was based on a temperature reading from the outer edge of the pan. The second set of data also includes a graphical representation of the pan with the temperature reading of the different areas around the pan.

The third set of data has temperature measurements after heating the vessel for 5 minutes with the microwave oven. The average temperature was measured at 254.6° C. The high temperature was measured at 271.0° C. The high was based on a temperature reading from the center of the pan. The low temperature was measured at 245.0° C. The low was based on a temperature reading from the outer edge of the pan. The third set of data also includes a graphical representation of the pan with the temperature reading of the different areas around the pan.

The fourth set of data has temperature measurements after heating the vessel for 10 minutes with the microwave oven. The average temperature was measured at 271.4° C. The high temperature was measured at 284.6° C. The high was based on a temperature reading from the center of the pan. The low temperature was measured at 260.3° C. The low was based on a temperature reading from the outer edge of the pan. The fourth set of data also includes a graphical representation of the pan with the temperature reading of the different areas around the pan.

Figure 17:
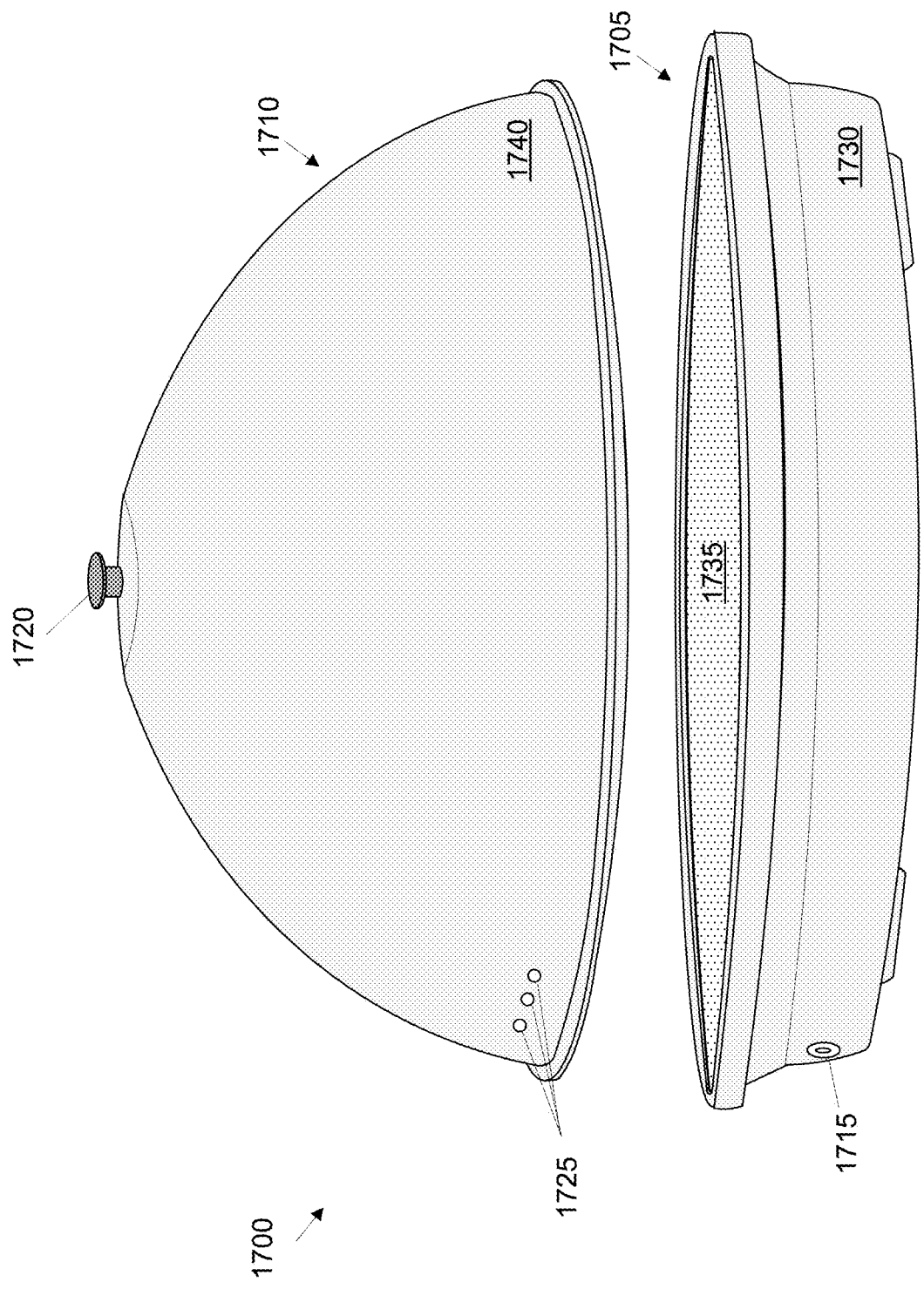
FIG. 17 illustrates a perspective view of a multi-layered exothermic microwave cooking apparatus that has an exothermic vessel and an exothermic lid.

Embodiments described herein also provide a multi-layered exothermic microwave cooking apparatus. FIG. 17 illustrates a perspective view of a multi-layered exothermic microwave cooking apparatus 1700 according to some embodiments of the invention. The cooking apparatus has an exothermic vessel 1705. In some embolisms, the vessel has an exothermic lid 1710 that is at least partially made with the same material as that of the outer shell body 1730 of the vessel 1705.

In some embodiments, the vessel 1705 and/or the lid 1710 are/is made with exothermic plastic. Exothermic plastic is high-heat resisting plastic mixed in with exothermic particles. For instance, the exothermic plastic may be a piece of polyphenylene sulfide (PPS) plastic mixed with exothermic particles. Also, for instance, the exothermic plastic may be a piece of syndiotactic polystyrene (SPS) plastic mixed with exothermic particles. The exothermic particles generate thermal emery (i.e., heat) by reacting to microwaves. In some embodiments, the exothermic particles include ferric oxide ($Fe_2O_3$) powder mixed with Manganese (Mn) and Zinc (Zn) powder, or copper-nickel-zinc (Cu—Ni—Zn) powder.

In some embodiments, the vessel 1705 and/or the lid 1710 are/is made with exothermic rubber. Exothermic rubber is high-heat resisting rubber mixed with exothermic particles. For instance, the vessel 1705 of FIG. 17 can be made with silicone rubber that is infused with exothermic particles.

The vessel of FIG. 17 has multiple shells, including the outer body shell and an inner shell or plate, that when coupled creates an inner chamber as will be described below. To release excess pressure within the inner chamber (not shown), the vessel 1705 has a safety pressure release valve 1715 installed on the side wall of the vessel. The pressure relief valve 1715 releases heated vapor from the inner chamber when the vessel is microwaved and pressure builds up in the inner chamber. The valve 1715 prevents the vessel's body or outer shell 1730 from being bent out of shape or cracked when pressure in the inner space reaches a certain threshold limit.

The vessel 1705 has an inner surface plate shell or cooking plate. In the example of FIG. 17, the inner plate is coated with a ceramic coat 1735. The ceramic coating is exothermic in that in can generate thermal energy when it is bombarded with microwaves.

As shown in FIG. 17, the multi-layered exothermic microwave cooking apparatus 1700 of some embodiments has a lid 1710. Different from the lid shown in FIG. 1, the lid 1710 of FIG. 17 does not have a silicone ring that is placed between the lid and vessel. In FIG. 1, the silicone ring prevents sparks from forming between the metallic lid and metallic vessel when that apparatus is in use. However, in the example of FIG. 17, the lid 1710 and body 1730 are made of exothermic plastic, and there are no two metal pieces that are in close proximity to one another to create such sparks.

In the example of FIG. 17, the lid 1710 is dome shaped or high-dome shaped. The dome shape promotes convection cooking or, in other words, allows hot air to circulate within the cooking area in order to cook food from all sides. So that the lid does not disengage from the vessel, the lid 1710 may include one or more vent holes 1725 as illustrated in FIG. 17. Different embodiments can have different-shaped lids or even no lid at all. In some embodiments, the lid 1710 includes a tempered glass disc such as the one illustrated in FIG. 3.

In some embodiments, the lid 1705 has a handle 1720. In the example of FIG. 17, a hole is pierced on about the center of the convexed plastic plate body 1740 of the lid 1710. A screw or coupling member (not shown) is inserted into that hold in order to couple the handle 1720 to the lid 1710. The handle 1720 can be formed on the lid with the exothermic plastic or exothermic silicone rubber. However, in such embodiments, the handle may be too hot to handle when the exothermic lid is heated with a microwave oven.

Figure 18:
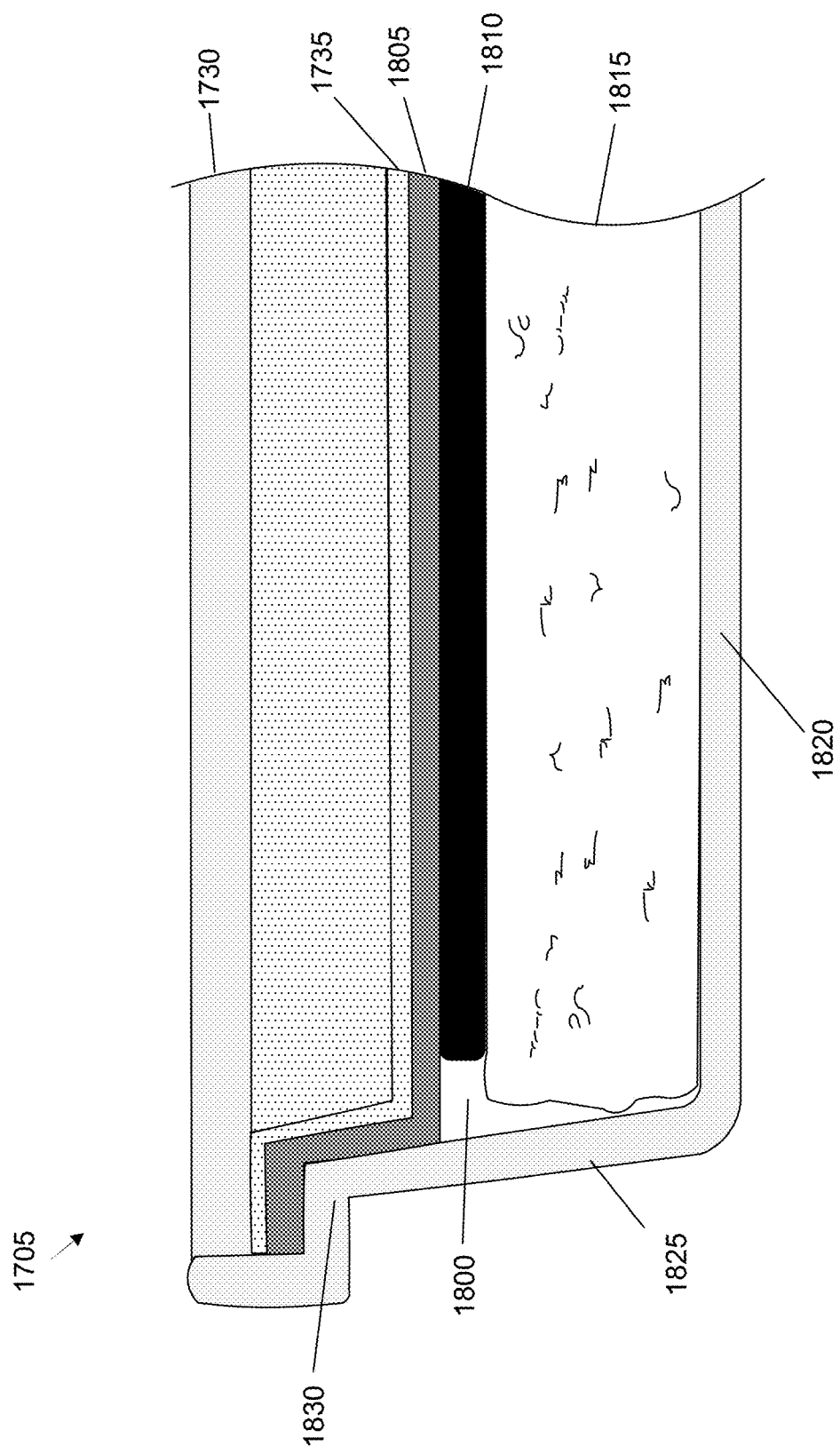
FIG. 18 shows a cross-sectional view of the different layers of the exothermic vessel of FIG. 17.

In some embodiments, the apparatus's vessel 1705 has multiple layers or a stack of items to generate and retain heat. FIG. 18 shows a cross-sectional view of the different layers of the exothermic vessel of FIG. 17.

As shown in FIG. 18, the vessel 1705 includes an exothermic plastic body shell 1730 that is shaped as a container. The vessel also has a cooking plate shell 1805 having top and bottom faces. The cooking plate 1805 is coated with a ceramic coat 1735. The ceramic coat 1735 can generate heat from microwave radiation.

The container body 1730 has a bottom surface 1820 and at least one side wall 1825. The cooking plate 1805 closes the exothermic container 1730 to create a cooking surface, and to form an inner space 1800 or chamber between the bottom surface 1820 and the plate 1805. In some embodiments, the plate and container is securely couple to one another via different methods known to those skilled in the arts. In the example of FIG. 18, the plate 1805 is shaped like a container and sits firmly on the rim 1830 of the exothermic container 1730. The two containers 1730 and 1805 may be glued or fastened to one another as well.

In some embodiments, the vessel 1705 includes an exothermic heating plate 1810 that is in contact with the outer bottom face of the inner cooking plate shell 1805. The heating plate 1810 may be glued or fastened in some manner to the bottom face of the cooking plate 1805. The exothermic heating plate 1810 further generates heat from microwave radiation. In some embodiments, the exothermic heating plate 1810 is made by blending $Fe_2O_3$, Mn, Zn, and silica powder with alumina (Al2O3) ceramic. The exothermic heating plate 1810 of some embodiments contains fibrous material or is wrapped with fiber, such as glass wool fiber.

In some embodiments, the exothermic vessel 1705 has an insulating material 1815 in the inner space 1800 of the vessel. Different embodiments can use different insulating material. For instance, the insulating material may be an insulation mat 1815 as illustrated in FIG. 18. Also, for instance, the insulating material may be quilted or shaped material (e.g., such as a heat-retaining microporous thermal quilted panel).

In some embodiments, the inner space 1800 has a reactive material to further insulate the vessel 1705. In some embodiments, the reactive material is getter that can absorb heated air and retain it for several hours. In some embodiments, a deposit of getter material is placed in the inner space 1800 of the multi-layered container 1705. In some embodiments, the getter comprises zirconium (Zr). In some embodiments, the getter is primarily zirconium-based in amount or volume but can include one or more other elements, e.g., aluminum (Al), cobalt (Co), iron (Fe), etc.

Figure 19:
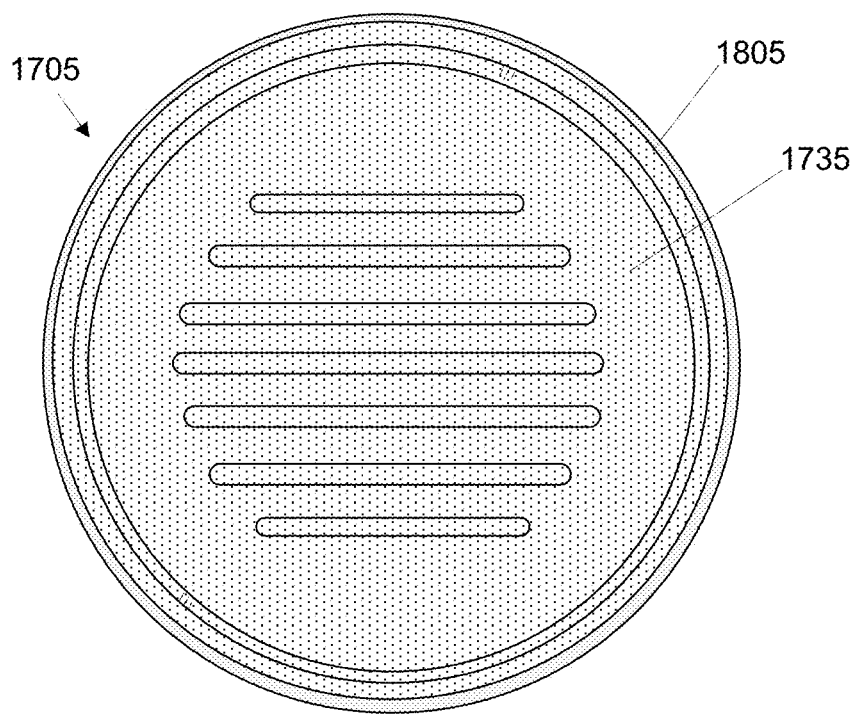
FIG. 19 shows a top view of the exothermic vessel shown in FIG. 17.

FIG. 19 shows a top view of the exothermic vessel 1705 shown in FIG. 17. As shown, the cooking plate 1805 is covered with the ceramic coat 1735. The plate 1805 has several grill marks in order to allow grilling with the vessel 1705. In some embodiments, the apparatus's plate is made with metal (e.g., copper, aluminum, stainless steel, or some other steel). In some embodiments, the plate is made with metal alloy such as carbon steel. In some embodiments, the plate is made of ceramic.

Figure 20:
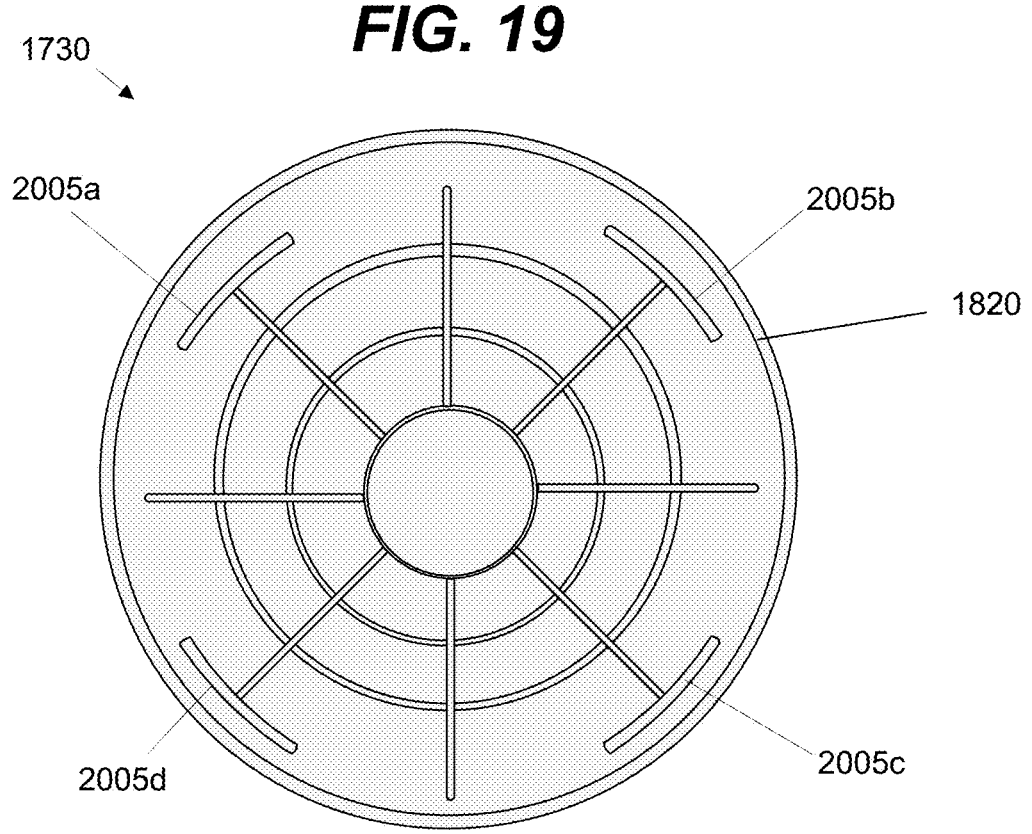
FIG. 20 shows a bottom view of the exothermic vessel shown in FIG. 17.

FIG. 20 shows a bottom view of the exothermic vessel shown in FIG. 17. Specifically, the figure shows the outer bottom surface of the exothermic plastic container 1730. Several legs or support structure 2005a-d are formed directly on the outer bottom surface 1820 of the container 1730.

Figure 21:
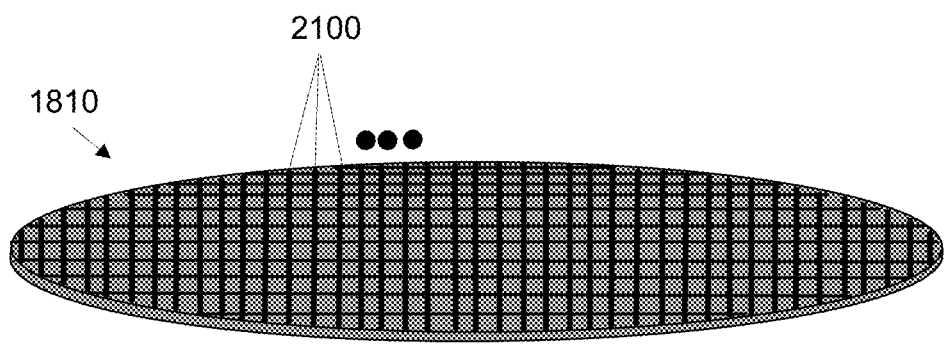
FIG. 21 shows a perspective view of an exothermic heating plate of the apparatus of FIG. 17.

FIG. 21 shows a perspective view of the exothermic heating plate 1810 of the apparatus of FIG. 17. As mentioned above, in some embodiments, the exothermic heating plate 1810 is made by blending Fe2O3, Mn, Zn, and silica powder with alumina (Al2O3) ceramic. As shown, the exothermic heating plate 1810 of some embodiments contains fibrous material or is wrapped or lined with fiber. The fiber gives the heating plate structural integrity to the alumina ceramic. That is, the lined-fiber assists in preventing the piece from falling apart (e.g., bending and cracking) when it rapidly changes temperature during use.

Figure 22:
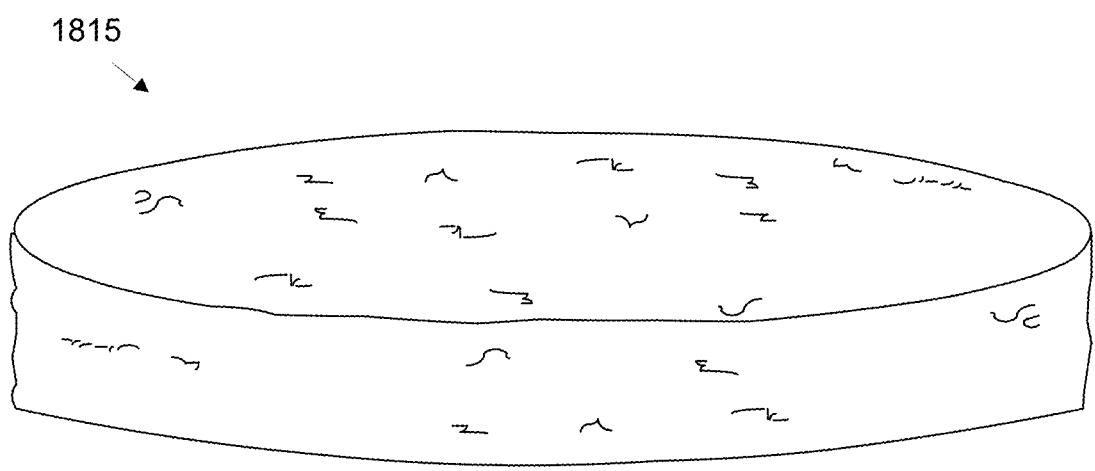
FIG. 22 illustrates a perspective view of an insulation mat of the apparatus of FIG. 17.

FIG. 22 illustrates a perspective view of an insulation mat 1815 of the apparatus of FIG. 17. The insulation mat 1815 is placed in inner space to trap heat. In some embodiments, the thickness or width of the mat closely matches the height of the inner space. In some embodiments, the inner space contains glass cloth for insulation. In some embodiments, the inner space includes a quilted panel. The panel may be made using glass cloth. The panel may be sewn into a pillow-like shape and filled with silica powder mixture. The panel may be sewn first closed and then compressed. The sewing technique allows the panel to be flexible. For instance, the quilted panel can be wrapped around the outer side wall of the inner shell of the double-walled vessel. The panel can also withstand abuse that the cookware is subject. That is, the panel is resistant to various vibration and motion of the vessel. Depending on the size of the inner chamber, the thicknesses of the panel may change.

In some embodiments, inner space contains a thin sheet of micro-porous insulation material. The thin sheet may be made with a micro-porous board material. As the board can be delicate, it might be coated in some manner to reinforce the board material. The thin sheet may be made primarily with pyrogenic silica. The thin sheet may be reinforced in some manner (e.g., with e-glass filament, oxide opacifier, etc.).

In some embodiments, the inner space includes a piece of foam to keep food items hot for several hours. In some embodiments, the foam is made of polyurethane. In some embodiments, the inner space is at least partially filled with a chemical gel. In some embodiments, the chemical gel includes ammonium nitrate, calcium chloride, sodium chloride, sodium acetate, and ammonium chloride. One of the benefits of using such a gel is for its endothermic performance or its ability to absorb heat. That is, the gel can be used to keep food cold for an extended period of time.

In some embodiments, the inner space may be at least partially filled with the thermal conductive medium. As a first example, the inner space may be filled with the above-mentioned fibrous medium. As another example, the inner space may be filled with the thin sheet of microporous material. In some embodiments, the inner space is at least partially filled with a set of one or more thermal conductive pads. The inner space can be filled at least partially with a thermal conductive gel. For faster heat absorption and transfer, the inner space may include a silicone-based material that is mixed with an aluminum oxide compound. In some embodiments, the inner space is at least partially filled with a silicone rubber having ferrite particles (e.g., manganese zinc (MnZn) ferrite particles). As mentioned above, in some embodiments, the inner space has a reactive medium (e.g., getter).

Figure 23:
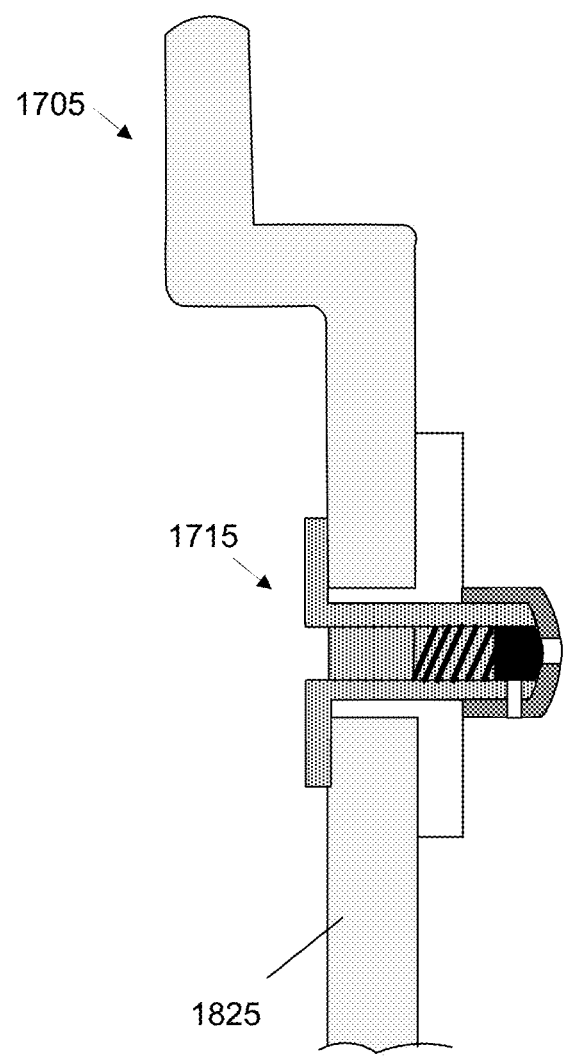
FIG. 23 shows a safety pressure release valve that is installed on the side wall of the apparatus of FIG. 17.

In some embodiment, the apparatus 1700 has safety valve 1715. FIG. 23 shows a safety pressure release valve that is installed on the side wall 1825 of the apparatus of FIG. 17. The valve 1715 prevents the exothermic plastic or rubber container from being bent out of shape and cracked when vapor pressure in the inner space reaches its threshold limit.

Figure 24:
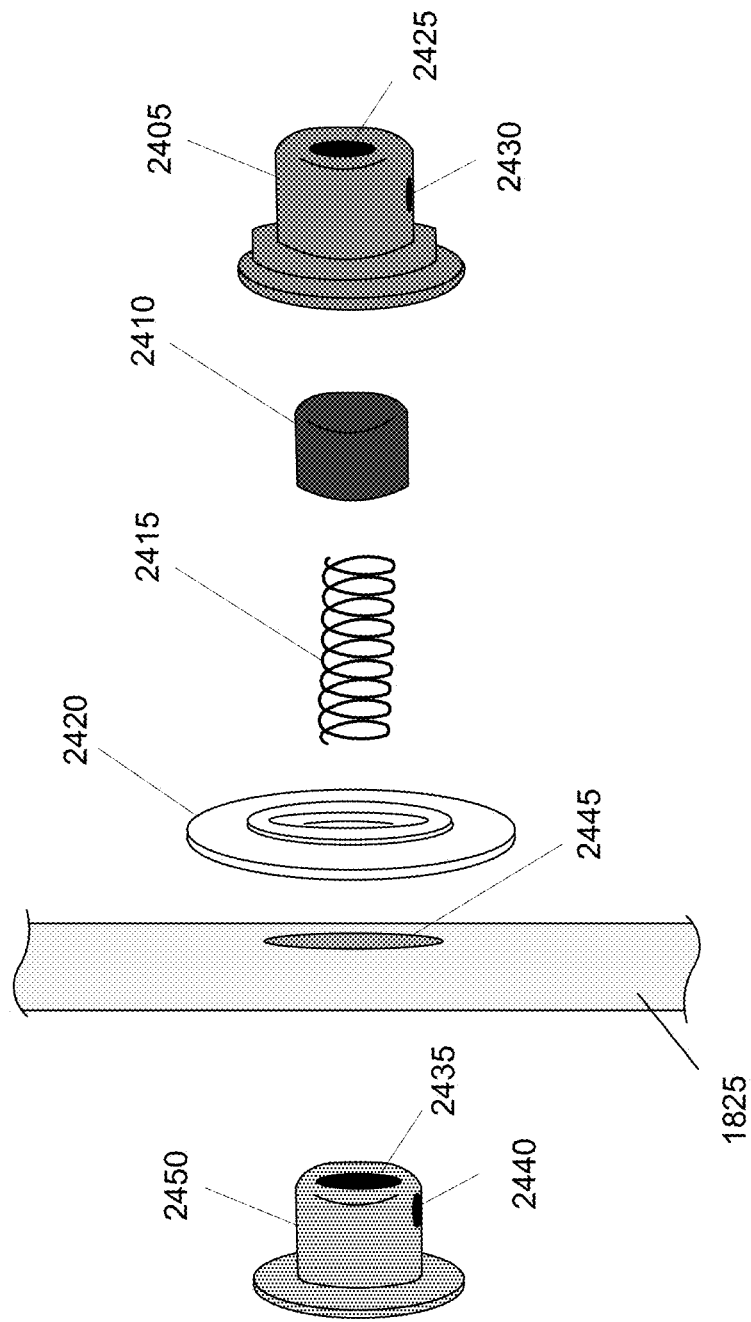
FIG. 24 shows an exploded view of the valve of FIG. 23.

FIG. 24 shows an exploded view of the valve of FIG. 23. The valve of some embodiments has the following parts: a cap 2405, a head 2410, a spring 2415, a washer 2420, and a housing 2450.

In some embodiments, the cap 2405 is made of metal or metal alloy. The cap 2405 also has one or more discharge ports or holes to let out excess pressure. The head 2410 of the valve fits into the cap 2405. The metal spring 2415 pushes the head 2410 against the cap 2405 to substantially close the holes 2425 and 2430. The housing 2450, which may be metal, is coupled with the cap 2405 to house the head 2410 and metal spring 2415. The housing 2450 has at least one matching discharge port 2435 or 2440 as the head 2405.

The safety valve may also include the washer (e.g., a silicone rubber cap 2420). The washer is placed around the hole 2445 formed on the inner side wall 1825 of the vessel. The washer's inner circle on one side may fit into the hole 2445, while the other side's inner circle may fit into the cap 2405.

Figure 25:
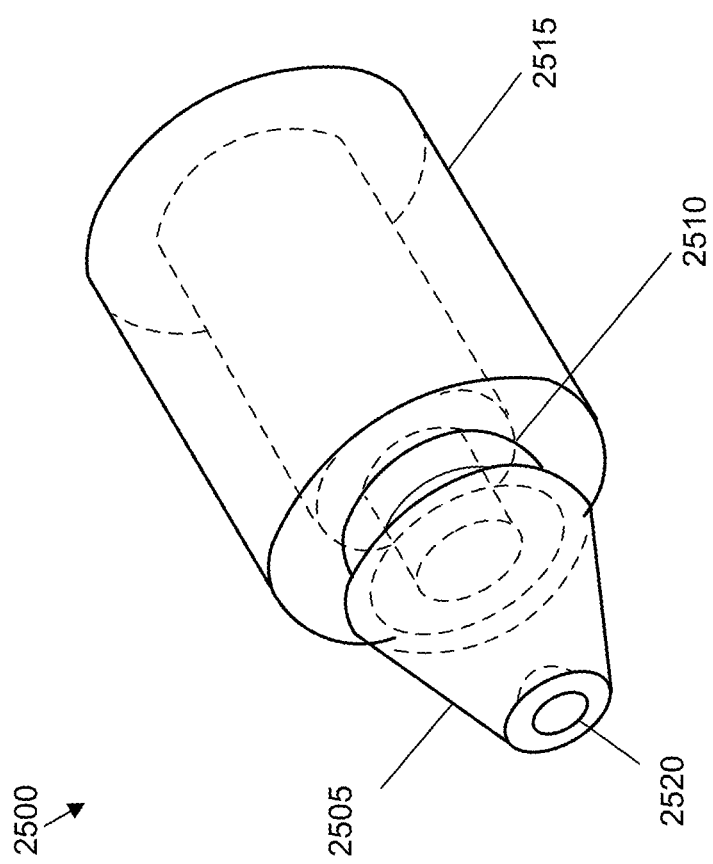
FIG. 25 shows an alternative silicone rubber valve for the safety valve of FIG. 23.

In some embodiments, the apparatus uses a spring-less valve. FIG. 25 shows a pressure control valve 2500 according to some embodiments of the invention. The silicone rubber valve can replace the head 2410 and spring 2415 of the valve 1715 of FIGS. 23 and 24. As shown, the valve 2500, in some embodiments, is made of an elastic or compressible material. The valve 2500 includes a head 2505 having a conical figure so as to open/close an opening formed on the outer shell of the vessel. The valve also includes a support frame 2515 that extends from the head 2505. The shape of the head 2505 may be of a spherical shape and the like. The diameter of the head 2505 is large enough to effectively seal the opening formed on the outer shell of the cooking vessel.

In some embodiments, a recess 2520 is formed on the head 2505 (e.g., on the side nearest to the opening formed on the outer shell) so as to receive a large force (pressure) generated from concentrating the pressure within the inner chamber of the vessel (e.g., on to the smaller square area of the recess instead of the whole side of the head 2505 nearest to the opening).

In some embodiments, the head 2505 extends from a support frame 2515, which has a hollow cylindrical figure, by a neck 2510, which is securely attached or formed next to the head and the support frame. In the example of FIG. 25, the diameter of the neck 2510 is smaller than the diameter of the support frame 2515, thus facilitating the compressibility of the valve 2500. Also, this difference in diameter facilitates further discharge of excess pressure through the support frame 2515 as well. At low temperatures or when there is insufficient pressure (e.g., steam pressure) generated within the inner chamber, the head 2505 effectively seals the opening formed on the outer shell to prevent unnecessary heat loss.

In some embodiments, the valve 2500 is made with silicone rubber because of its elasticity as well as its resistance to high temperature.

Figure 26:
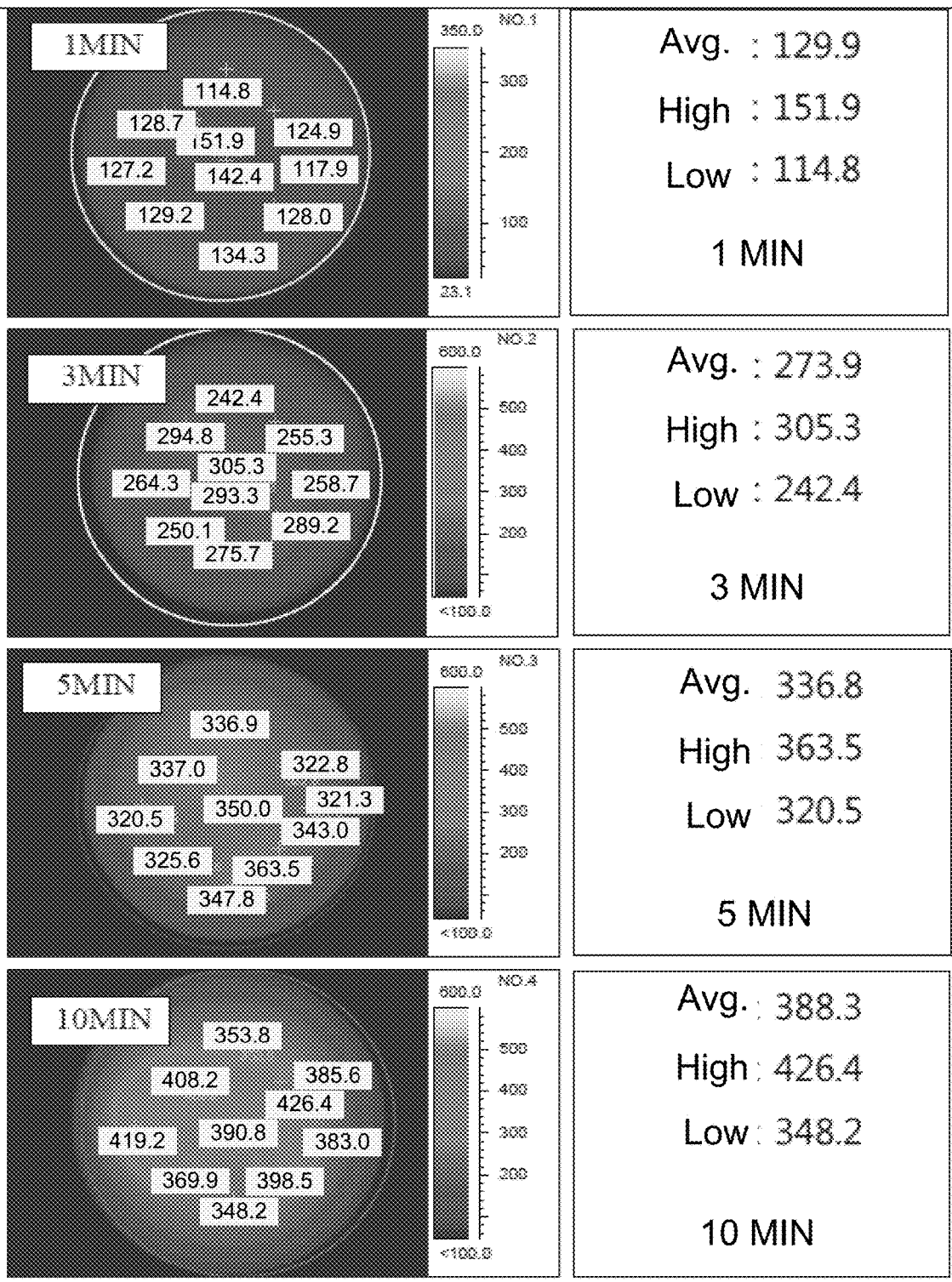
FIG. 26 shows the results of a first exothermic test performed on an exothermic microwavable vessel.

FIG. 26 shows the results of a first exothermic test performed on the multi-layered vessel of FIG. 17. The test was performed with a multi-layered vessel having a 260 millimeter (mm) diameter. The test was performed with a 1000 Watt (W) microwave oven. The results show the temperature in degrees Celsius (C).

As shown in FIG. 26, the results include four sets of data. The first set of data has temperature measurements after heating the vessel for just 1 minute with the microwave oven. The average temperature was measured at 129.9° C. The high temperature was measured at 151.9° C. The low temperature was measured at 114.8° C. The first set of data also includes a graphical representation of the pan with the temperature reading of the different areas around the pan.

The second set of data has temperature measurements after heating the vessel for 3 minutes with the microwave oven. The average temperature was measured at 273.9° C. The high temperature was measured at 305.3° C. The low temperature was measured at 242.4° C. The second set of data also includes a graphical representation of the pan with the temperature reading of the different areas around the pan.

The third set of data has temperature measurements after heating the vessel for 5 minutes with the microwave oven. The average temperature was measured at 336.8° C. The high temperature was measured at 363.5° C. The low temperature was measured at 320.5° C. The third set of data also includes a graphical representation of the pan with the temperature reading of the different areas around the pan.

The fourth set of data has temperature measurements after heating the vessel for 10 minutes with the microwave oven. The average temperature was measured at 388.3° C. The high temperature was measured at 426.4° C. The low temperature was measured at 348.2° C. The fourth set of data also includes a graphical representation of the pan with the temperature reading of the different areas around the pan.

Figure 27:
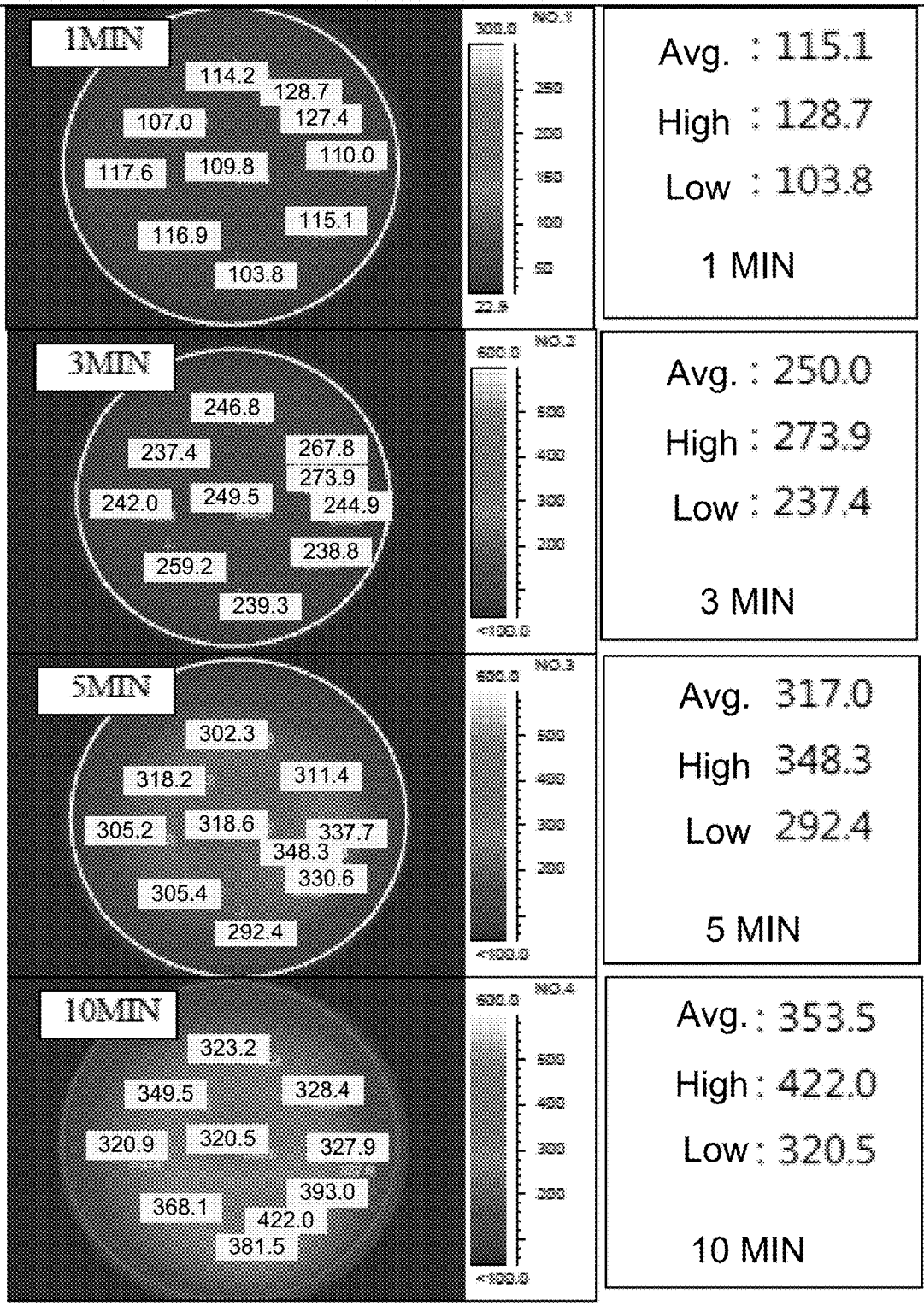
FIG. 27 shows the results of another exothermic test performed on another exothermic different-sized microwavable vessel.

FIG. 27 shows the results of a second exothermic test performed on the multi-layered vessel of FIG. 17. For this test, the multi-layered vessel was a pizza pan with a diameter of about 260 mm. The test was performed with a 1000 Watt (W) microwave oven. The results show the temperature in degrees Celsius (C).

As shown in FIG. 27, the results include four sets of data. The first set of data has temperature measurements after heating the vessel for just 1 minute with the microwave oven. The average temperature was measured at 115.1° C. The high temperature was measured at 128.7° C. The low temperature was measured at 103.8° C. The first set of data also includes a graphical representation of the pan with the temperature reading of the different areas around the pan.

The second set of data has temperature measurements after heating the vessel for 3 minutes with the microwave oven. The average temperature was measured at 250.0° C. The high temperature was measured at 273.9° C. The low temperature was measured at 237.4° C. The second set of data also includes a graphical representation of the pan with the temperature reading of the different areas around the pan.

The third set of data has temperature measurements after heating the vessel for 5 minutes with the microwave oven. The average temperature was measured at 317.0° C. The high temperature was measured at 348.3° C. The low temperature was measured at 292.4° C. The third set of data also includes a graphical representation of the pan with the temperature reading of the different areas around the pan.

The fourth set of data has temperature measurements after heating the vessel for 10 minutes with the microwave oven. The average temperature was measured at 353.5° C. The high temperature was measured at 422.0° C. The low temperature was measured at 320.5° C. The fourth set of data also includes a graphical representation of the pan with the temperature reading of the different areas around the pan.

As indicated above, the apparatus of some embodiments has an exothermic heating plate having a top face that is in contact with outer bottom surface of the inner shell. This is to transfer the generated heat to the cooking surface. Several different versions of multi-layered vessels with such an exothermic heating plate will now be described by reference to FIGS. 28-31. These figures are similar to FIGS. 8-11, but include the heating plate 1810 shown in FIGS. 18 and 21.

Figure 28:
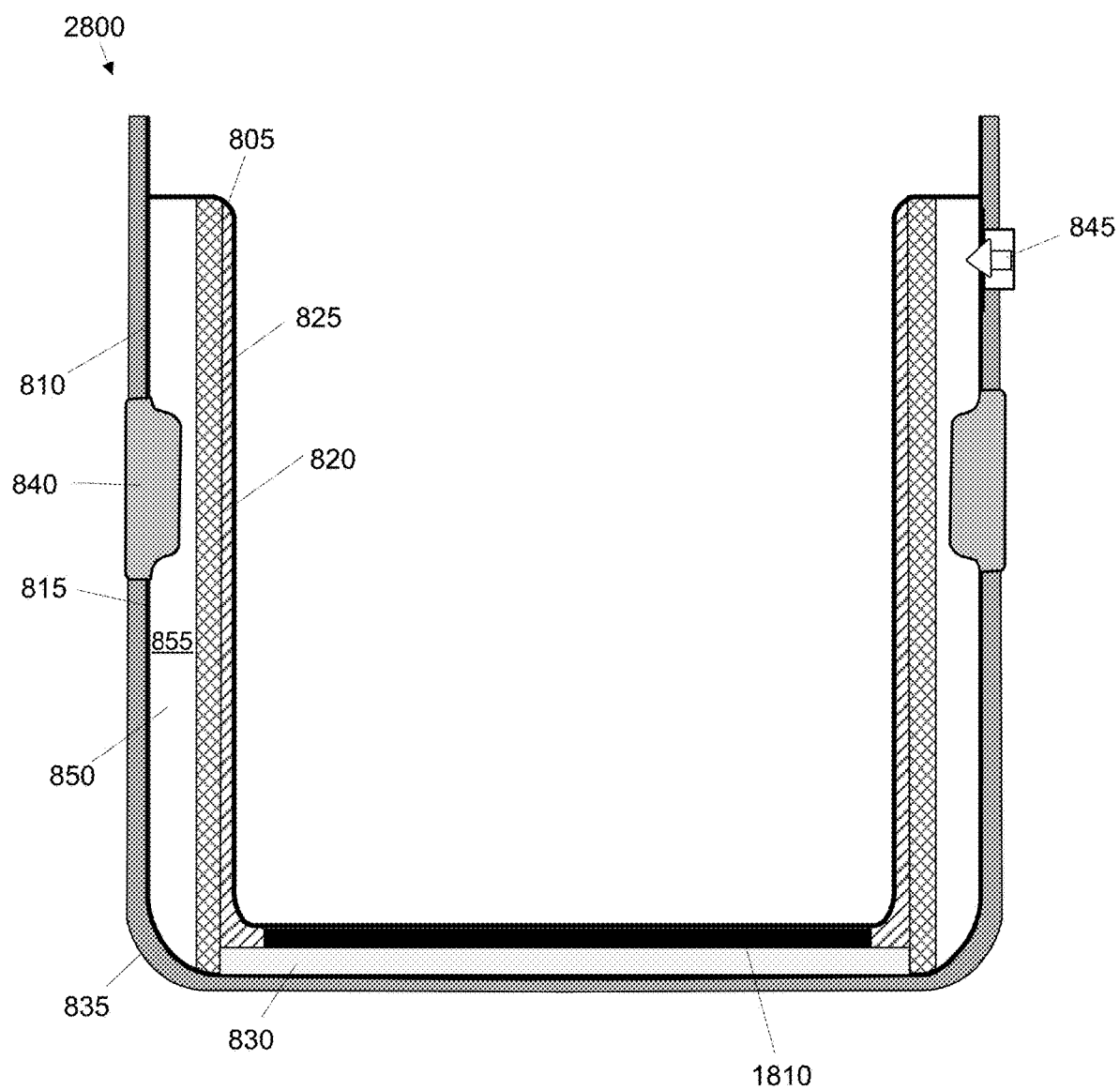
FIG. 28 illustrates a double walled vessel of the microwave cooking apparatus according to some embodiments.

FIG. 28 illustrates a double walled vessel 2800 of the microwave cooking apparatus according to some embodiments. This figure is similar to FIG. 8, but it shows the plate 1810.

Figure 29:
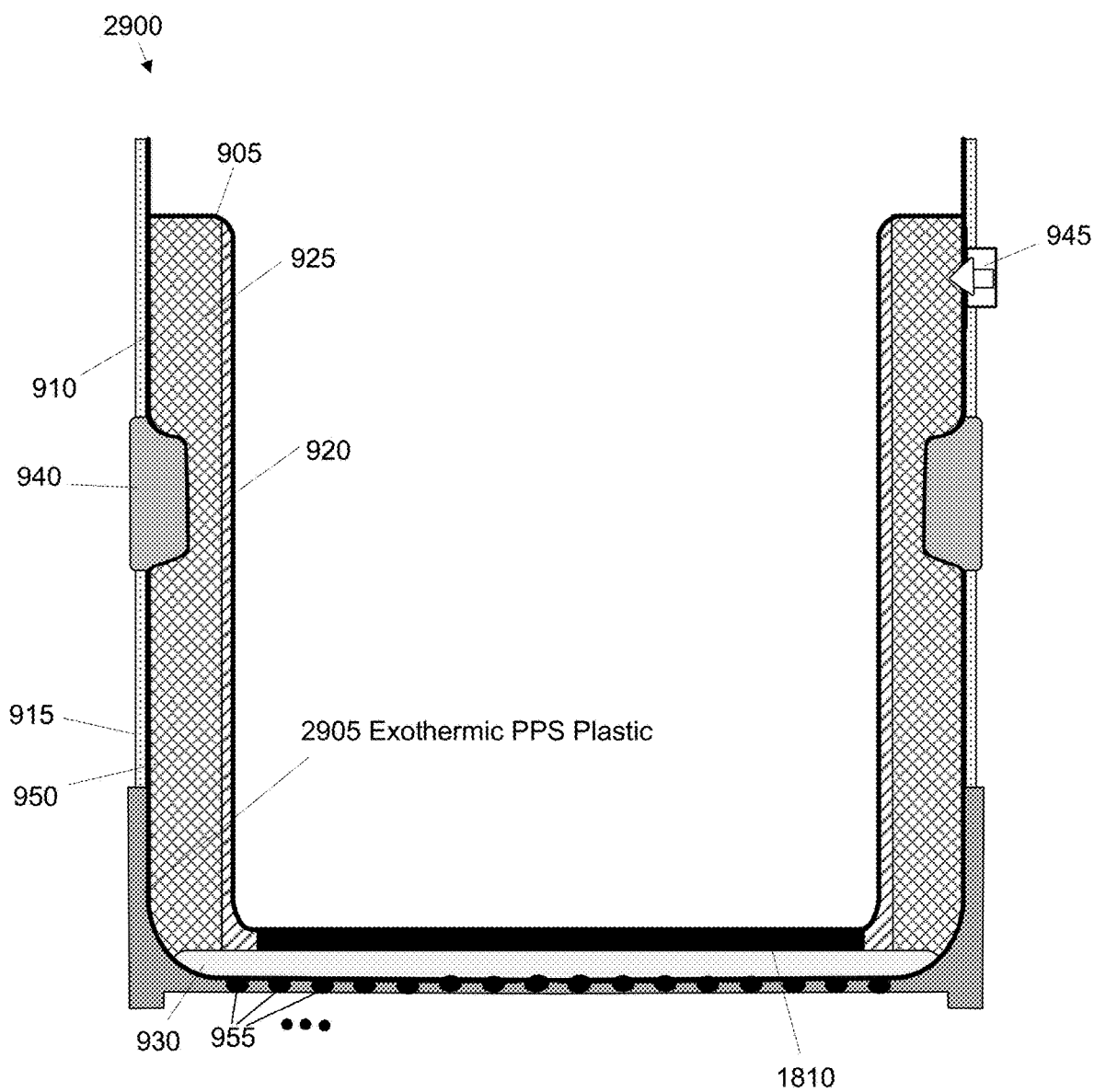
FIG. 29 illustrates a double walled vessel of the microwave cooking apparatus according to some embodiments.

FIG. 29 illustrates a double walled vessel 2900 of the microwave cooking apparatus according to some embodiments. This figure is similar to FIG. 9, but it shows the plate 1810. Also, in this figure the outer shell 2905 is made with exothermic PPS plastic.

Figure 30:
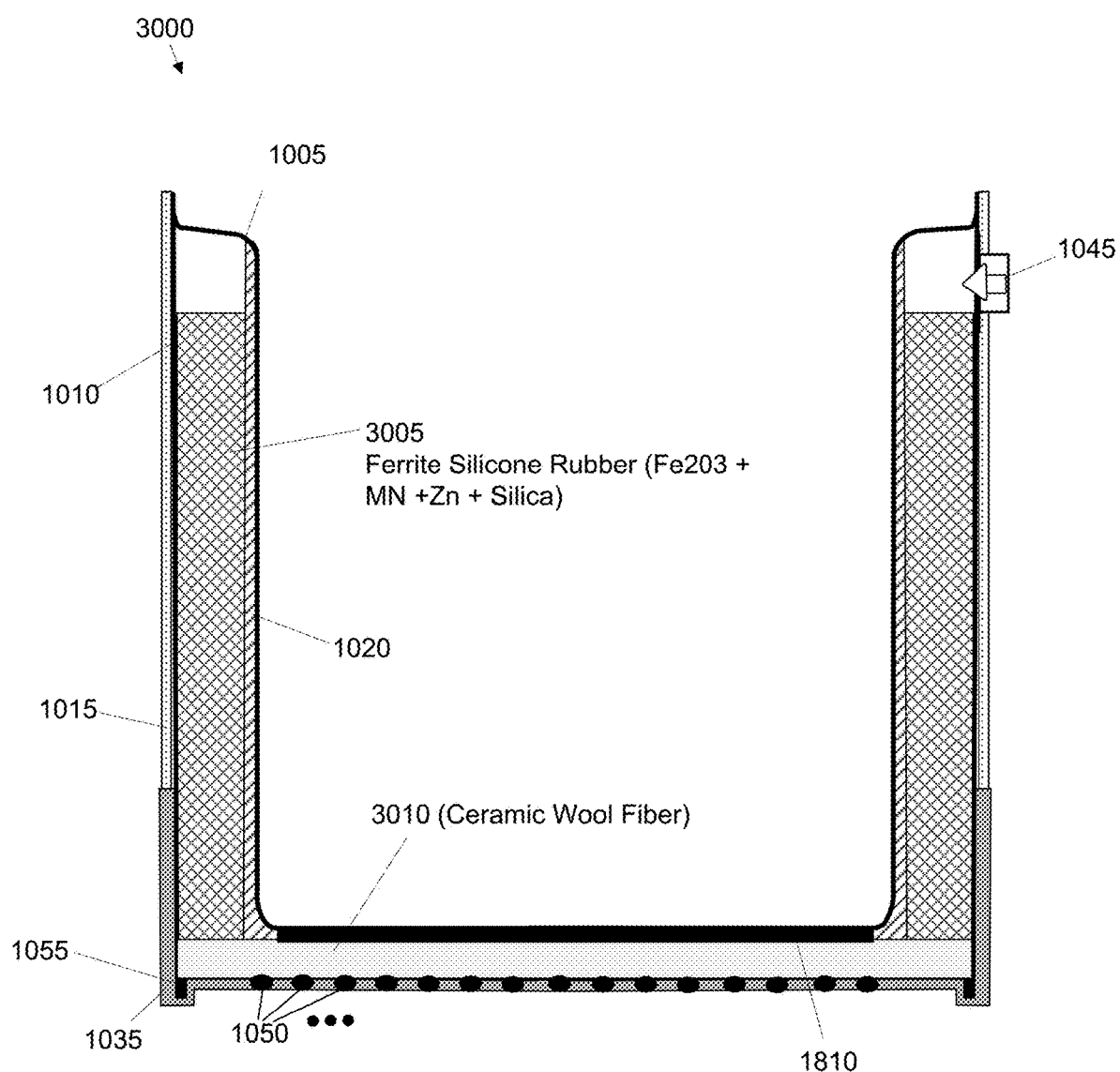
FIG. 30 illustrates a double walled vessel of the microwave cooking apparatus according to some embodiments.

FIG. 30 illustrates a double walled vessel 3000 of the microwave cooking apparatus according to some embodiments. This figure is similar to FIG. 10, but it shows the plate 1810. Also, in this example, the inner shell is wrapped with ferrite silicone rubber 3005 (e.g., having $Fe_2O_3$, Mn, Zn, and silica). Also, the bottom inner space between two shells is insulated with ceramic wool fiber 3010.

Figure 31:
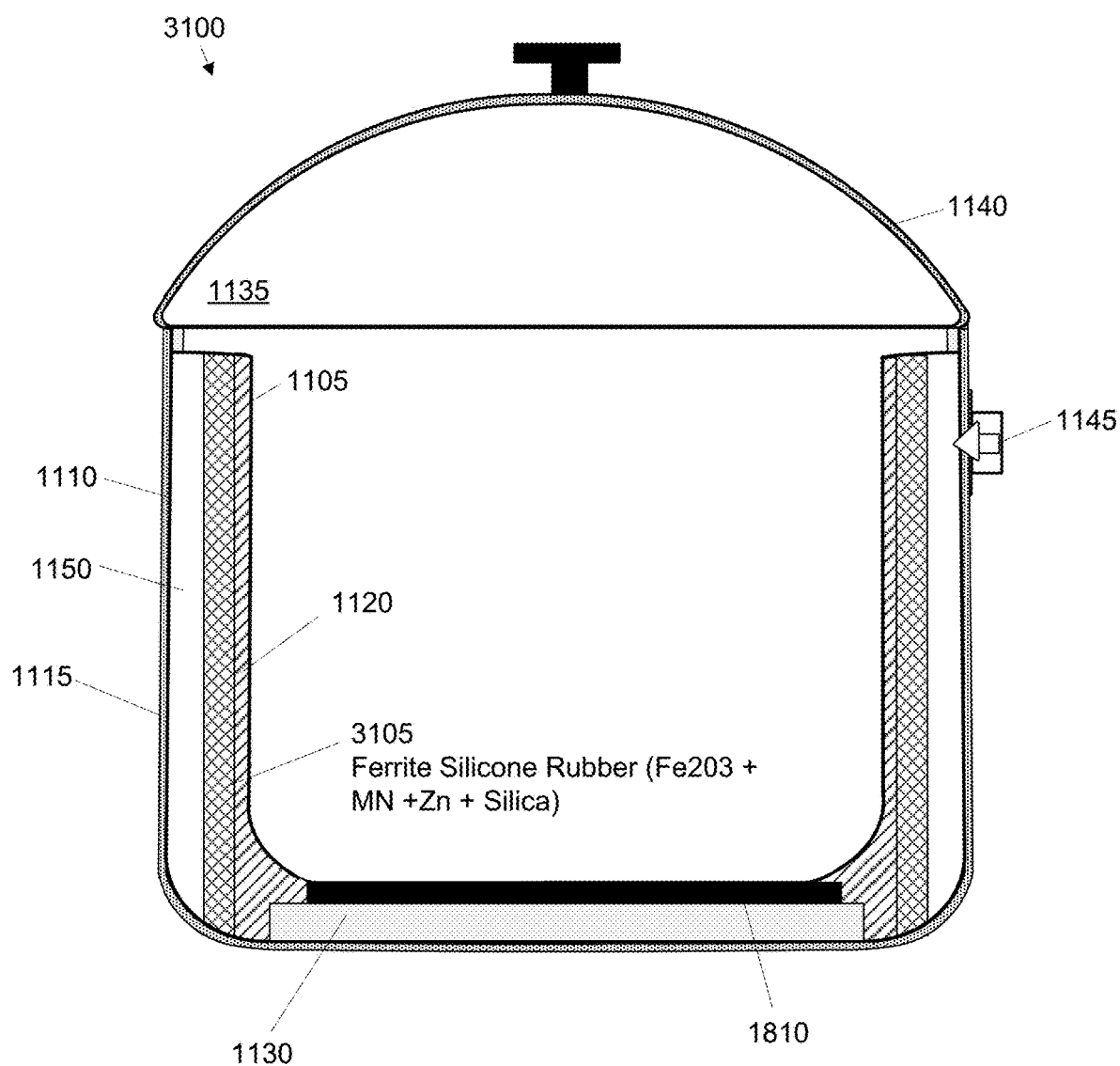
FIG. 31 illustrates a double walled infrared cookware according to some embodiments.

FIG. 31 illustrates a double walled vessel 3100 of the microwave cooking apparatus according to some embodiments. This figure is similar to FIG. 11, but it shows the plate 1810. Also, in this example, the inner shell is wrapped with ferrite silicone rubber 3105 (e.g., having Fe2O3, Mn, Zn, and silica).

While the invention has been described with reference to numerous specific details, it is to be understood that the invention can be embodied in other specific forms without departing from the spirit of the invention. For instance, any one of the vessels described above without the coat of exothermic enamel glaze can be coated with that glaze. Thus, one of ordinary skill in the art would understand that the invention is not to be limited by the foregoing illustrative details, but rather is to be defined by the appended claims.

What is claimed is:

1. A microwave cooking apparatus comprising:
an exothermic vessel comprising:
a cooking plate shell shaped as a container having top and bottom surfaces, wherein a ceramic coating is made on the top surface of the cooking plate shell;
an outer shell body made of polyphenylene sulfide (PPS) plastic or syndiotactic polystyrene (SPS) plastic mixed with exothermic particles including ferrite ($Fe_2O_3$) powder and at least one powder selected from the group comprising magnesium copper zinc (MgCuZn) powder, nickel zinc (NiZn) powder, silicon oxide ($SiO_2$), aluminum oxide ($Al_2O_3$), and manganese zinc (MnZn) powder in order to generate heat from microwave radiation when the outer shell body is bombarded with microwaves,
wherein the outer shell body has top and bottom surfaces, and at least one side wall, and
wherein the cooking plate shell closes the exothermic plastic vessel to create a cooking surface, and to form an inner space between the bottom surface of the cooking plate shell and an the top surface of the outer shell body;
an exothermic heating plate comprising the exothermic particles that includes $Fe_2O_3$, Mn, Zn, and silica powder blended with alumina ceramic powder,
wherein the exothermic heating plate is attached to the bottom surface of the outer body shell, and
wherein the exothermic heating plate further generates heat from the microwave radiation when bombarded with the microwaves; and
a safety valve, which is installed on the at least one side wall of the outer shell body, to release excess pressure from the inner space between the bottom surface of the cooking plate shell and the top surface of the outer shell body during a microwave cooking.

2. The microwave cooking apparatus of claim 1, wherein the exothermic heating plate comprises glass wool fiber.

3. The microwave cooking apparatus of claim 1 further comprising a microporous insulation panel in the inner space between the bottom surface of the cooking plate shell and the top surface of the outer shell.

4. The microwave cooking apparatus of claim 1 further comprising an insulation mat in the inner space between the bottom surface of the cooking plate shell and the top surface of the outer shell.

5. The microwave cooking apparatus of claim 1 further comprising an exothermic plastic lid that is made with the same plastic as the outer shell body to further generate heat from the microwave radiation when the exothermic plastic lid is bombarded with the microwaves.

6. The microwave cooking apparatus of claim 1, wherein the cooking plate shell is made with metal or metal alloy.

7. The microwave cooking apparatus of claim 6, wherein the metal is copper or aluminum, and the metal alloy is carbon steel.

8. The microwave cooking apparatus of claim 1, wherein the safety valve is a spring-based valve.

9. The microwave cooking apparatus of claim 8, wherein the safety valve comprises:
a metal cap with at least one hole,
a head that fits into the metal cap,
a metal spring to push the head against the metal cap to substantially close the at least one hole, and
a metal housing that is coupled with the metal cap to house the head and the metal spring.

10. The microwave cooking apparatus of claim 9 further comprising a silicone rubber cap or washer that is placed about a hole formed on the inner side of the at least one side wall of the exothermic plastic vessel and the metal cap.

11. The microwave cooking apparatus of claim 1, wherein the safety valve comprises a spring-less silicone rubber valve.

12. The microwave cooking apparatus of claim 1, wherein a plurality of legs are formed on a bottom surface of the exothermic heating plate.

* * * * *